United States Patent [19]
Mitchell et al.

[11] Patent Number: 5,126,948
[45] Date of Patent: Jun. 30, 1992

[54] DIGITAL POSITION ENCODER AND DATA OPTIMIZER

[75] Inventors: Lee D. Mitchell, Grand Prairie; Mark Rice, Bedford, both of Tex.

[73] Assignee: LTV Aerospace and Defense Company, Grand Prairie, Tex.

[21] Appl. No.: 434,983

[22] Filed: Nov. 8, 1989

[51] Int. Cl.⁵ .................................. G06F 15/46
[52] U.S. Cl. .................. 364/474.03; 364/191; 364/474.37
[58] Field of Search .......... 364/474.03, 474.37, 364/513, 560, 561, 191–193; 318/577, 578, 568.1; 33/503, 504, 505; 901/3–5; 395/80, 99

[56] References Cited

U.S. PATENT DOCUMENTS

| | | | |
|---|---|---|---|
| Re. 30,132 | 10/1979 | Irie | 318/568 |
| 3,449,742 | 6/1969 | Stapleton | 340/347 |
| 4,163,183 | 7/1979 | Engelberger | 318/568 |
| 4,258,425 | 3/1981 | Ramsey | 364/513 |
| 4,260,940 | 4/1981 | Engelberger | 318/562 |
| 4,260,941 | 4/1982 | Engelberger | 318/562 |
| 4,348,731 | 9/1982 | Kogawa | 364/513 |
| 4,385,358 | 5/1983 | Ito | 364/513 |
| 4,420,812 | 12/1983 | Ito | 364/513 |
| 4,446,529 | 5/1984 | Strolle | 364/723 |
| 4,472,782 | 9/1984 | Suzuki | 364/474.03 |
| 4,542,328 | 9/1985 | Pouyet | 318/573 |
| 4,630,309 | 12/1986 | Karow | 382/56 |
| 4,689,756 | 8/1987 | Koyama | 364/513 |
| 4,698,777 | 10/1987 | Toyoda | 364/513 |
| 4,807,143 | 2/1989 | Matsuura | 364/167.01 X |
| 4,872,105 | 10/1989 | Mozayeny | 364/474.03 X |

FOREIGN PATENT DOCUMENTS 2058407A  4/1981  United Kingdom .

*Primary Examiner*—Joseph Ruggiero
*Attorney, Agent, or Firm*—Arnold, White & Durkee

[57] ABSTRACT

A digitizing system for automatically recording data points representative of, for example, sheet metal templates having varying shapes is disclosed. A stylus connected to a tracing arm is guided along the edge of a template. As the arm moves, digital scales generate a stream of encoded electrical pulses which yield direction and distance information. These pulses are then decoded, counted, and stored. If the operator has selected the automatic digitize mode, a data point is automatically stored each time the stylus moves a predetermined distance in the X, Y, or Z direction. The present invention also provides an improved method of optimizing or compressing the stored set of data points.

23 Claims, 17 Drawing Sheets

DUAL 1-OF-4 DATA SELECTOR

| Pin 2 | Pin 14 | Selected Input Pins | Count Up Pin 7 | Count Down Pin 9 |
|-------|--------|---------------------|----------------|------------------|
| L | L | 6(H) 10(L) | H | L |
| L | L | 6(L) 10(L) | L | L |
| L | H | 5(L) 11(H) | L | H |
| L | H | 5(L) 11(L) | L | L |
| H | L | 4(H) 12(L) | H | L |
| H | H | 3(H) 13(L) | H | L |

NOTE:
\*Pins 3 and 4 are tied to a logic 1 level.
\*Pins 5, 10, 12 and 13 are tied to ground.
\*Pins 6 and 11 are connected to the output of XOR gate 80.

Fig. 5c

X, Y, and Z COORDINATES IN ASCII

| | Data 0 | Data 1 | Data 2 | Data 3 | Data 4 | Data 5 | Data 6 |
|---|---|---|---|---|---|---|---|
| X | 0 | 0 | 0 | 1 | 1 | 0 | 1 |
| + | 1 | 1 | 0 | 1 | 0 | 1 | 0 |
| 0 | 0 | 0 | 0 | 0 | 1 | 1 | 0 |
| 0 | 0 | 0 | 0 | 0 | 1 | 1 | 0 |
| 0 | 0 | 0 | 0 | 0 | 1 | 1 | 0 |
| 2 | 0 | 1 | 0 | 0 | 1 | 1 | 0 |
| 5 | 1 | 0 | 1 | 0 | 1 | 1 | 0 |
| 0 | 0 | 0 | 0 | 0 | 1 | 1 | 0 |
| Y | 1 | 0 | 0 | 1 | 1 | 0 | 1 |
| − | 1 | 0 | 1 | 1 | 0 | 1 | 0 |
| 0 | 0 | 0 | 0 | 0 | 1 | 1 | 0 |
| 0 | 0 | 0 | 0 | 0 | 1 | 1 | 0 |
| 0 | 0 | 0 | 0 | 0 | 1 | 1 | 0 |
| 1 | 1 | 0 | 0 | 0 | 1 | 1 | 0 |
| 2 | 0 | 1 | 0 | 0 | 1 | 1 | 0 |
| 7 | 1 | 1 | 1 | 0 | 1 | 1 | 0 |
| Z | 0 | 1 | 0 | 1 | 1 | 0 | 1 |
| + | 1 | 1 | 0 | 1 | 0 | 1 | 0 |
| 0 | 0 | 0 | 0 | 0 | 1 | 1 | 0 |
| 2 | 0 | 1 | 0 | 0 | 1 | 1 | 0 |
| 6 | 0 | 1 | 1 | 0 | 1 | 1 | 0 |
| 1 | 1 | 0 | 0 | 0 | 1 | 1 | 0 |
| 0 | 0 | 0 | 0 | 0 | 1 | 1 | 0 |
| 0 | 0 | 0 | 0 | 0 | 1 | 1 | 0 |

Fig. 6c

I/O ADDRESS DECODER / SELECTOR UNIT

OUTPUT COMMANDS
PC TO DIGITIZER CARD

| I/O PORT | WRITE DATA D7 D6 D5 D4 D3 D2 D1 D0 | COMMAND |
|---|---|---|
| H300 | X X X X X X X 1 | CLEAR |
| H300 | X X X X X X 1 X | LOAD REGISTERS |
| H300 | X X X X X 1 X X | NOT USED |
| H300 | X X X X 1 X X X | RESET DATA FLAGS |
| H303 | X X X X X X X 1 | ENABLE AUTOMATIC |

Fig. 8b

INPUT
DIGITIZER CARD TO PC

| I/O PORT | READ DATA D7 D6 D5 D4 D3 D2 D1 D0 | REQUESTS/DATA |
|---|---|---|
| H301 | X X X X X X X 1 | AUTO DIGITIZE REQ |
| H301 | X X X X X X 1 X | MANUAL DIGITIZE REQ |
| H301 | X X X X X 1 X X | MANUAL ZERO REQ |
| H301 | X X X X 1 X X X | END SEQUENCE REQ |
| H301 | X X X 1 X X X X | Z DOWN |
| H301 | X X 1 X X X X X | Z UP |
| H302 | 0 1 0 1 1 0 0 0 | X |
| H302 | . . . . . . . . | SIGN |
| . | . . | N |
| . | . SIXTEEN SEQUENT- . | N |
| . | . IAL READS TO . | N |
| . | . TRANSFER X AND Y . | N |
| . | . COORDINATES IN . | N |
| . | . ASCII FORMAT . | N |
| . | . . | Y |
| . | . (TWENTY-FOUR . | SIGN |
| . | .   READS FOR X, Y, . | N |
| . | .   AND Z . | N |
| . | .   COORDINATES) . | N |
| . | . . | N |
| . | . . | N |
| H302 | . . . . . . . . | N |

Fig. 8c $D = | L \cos(\text{Tan}^{-1} M) |$
$M = $ Slope of Line A
$B = $ Y intercept of A
$B' = $ Y intercept of A'
$L = | B - B' |$ ced by the stylus are recorded for subsequent use. These data points define a digital abstraction of the original object.

DIGITAL POSITION ENCODER AND DATA OPTIMIZER

BACKGROUND OF THE INVENTION

1. Field of the Invention

This invention relates to a system for tracing two and three dimensional contoured surfaces, and for recording and optimizing data points representative of the traced surface. The present invention can automatically record all points along a traced path and discard unnecessary points so as to minimize the file size of the recorded points.

2. Description of the Prior Art

Systems, known as digitizers, for tracing contoured surfaces and storing the representative data points, are well known. In a conventional digitizing scheme, a stylus or tracer is displaceable over a two or three dimensional object to establish the outer dimensions of said object. During the tracing routine, data points representing the surface dimensions of the object are recorded for subsequent use. These data points define a digital abstraction of the original object.

The digitized points can be recorded manually by the operator, or automatically at given time intervals or distance intervals. Manual recording is acceptable if the pattern to be digitized is small or is a relatively straight-edged shape. However, if the shape to be digitized is large and complex, automatic recording is a virtual necessity. An advantage of automatic recording is that many more points can be recorded in a given interval resulting in a more accurate digital representation of the shape. Also, since the operator need not stop his tracing motion to record a point, he can devote his full attention to guiding the stylus around the template.

Although automatic recording reduces the burden on the operator, many unnecessary points may be recorded. Unlike manual recording, wherein the operator records only those points lying along contoured or curved surfaces and does not record multiple points lying on a straight line, automatic recording periodically records points along both straight and contoured surfaces. Thus, automatic recording may result in unnecessary recordation of many points that are not needed for accurate duplication of the traced template. Furthermore, the resulting data file can be very large if the digitized shape is large and/or complex.

In order to alleviate this problem, it is desirable to discard unnecessary data points from the data file. This process is known as optimizing. Optimizing is the technique of compressing a file of digitized coordinate data in order to save memory space. The ideal optimizing routine would discard the maximum number of digitized data points in the fastest possible time without substantially altering the original digitized path.

One method of optimizing is known as playback optimizing. According to this method, a first file of coordinate data corresponding to stylus movement around a template is created. Next, the previous stylus path is repeated or played back according to the original data file, only at a much slower speed. As the arm motion is played back, the operator may designate which data points should be kept. These data points are stored in a second file of coordinate data thereby creating a compressed file of data points. (See, U.S. Pat. No. 4,385,358 to Ito et al.) Of course, this method is extremely slow and subject to error. Further, there must be enough space in the memory means to store both the original data file and the compressed data file simultaneously.

According to another known method of optimization, a first file of coordinate data corresponding to stylus movement around a template is created. Thereafter, a comparator circuit compares data point $P_i$ to data point $P_{i+1}$. If the absolute value of the difference is greater than a predetermined offset value, then the latter point is stored in a second file of coordinate data. If the difference is less than the offset, then the point $P_{i+1}$ is not stored in the second data file. If $P_{i+1}$ is not saved in the second file, then the point $P_i$ is compared to point $P_{i+2}$. This process is repeated for every point in the arm motion path. (See, e.g., U.S. Pat. No. 4,385,358 to Ito et al.) The result of this method of optimization is simply to reduce the resolution of the digital image stored in the original file by a factor proportional to the predetermined offset value. Points that could have been discarded without substantially altering the original digitized path will be kept, and points will be discarded that could substantially alter the original digitized path. Furthermore, the memory means must contain sufficient space to store both the original data file and the compressed second file simultaneously.

Thus, the problems associated with conventional optimizer routines make these systems impractical for use with complex template shapes having large data files. Further, while an efficient optimization routine would be advantageous, a digitizer system could be further improved if the data generated by the digitizing apparatus could be stored in a format such as ASCII that could easily be read and manipulated by a simple and inexpensive personal computer ("PC").

SUMMARY OF THE INVENTION

In accordance with the present invention, a digitizing system for automatically recording data points representative of, for example, sheet metal templates having varying shapes is provided. The digitizing system includes an "IBM" compatible personal computer ("PC"), special software, a special interface card within the computer, a table with a tracing arm, and digital measuring scales mounted on the arm to record movement in the X and Y axes. Optionally, the system can be constructed as a three-dimensional digitizer in which case coordinates in the Z axis are also measured and recorded. Once a part is digitized and the data points are stored in memory, sheet metal copies of the template can be cut by a computer controlled cutter utilizing an optimized set of the recorded data points.

A stylus connected to the tracing arm is guided along the edge of a template. As the arm moves, digital scales generate a stream of encoded electrical pulses which yield direction and distance information. The pulses are sent from the scaling network attached to the digitizer arm to a digitizer circuit card in the PC. These pulses are then decoded, counted and stored. If the operator has selected the automatic digitize mode, a data point is automatically stored each time the stylus moves a predetermined distance in the X, Y, or Z direction. This feature allows the operator to devote his full attention to guiding the stylus around the template without stopping his tracing motion to record a point. Furthermore, this feature establishes a predetermined maximum distance between any two consecutive recorded points under normal operating conditions. Means are provided for preventing the loss of data points when the stylus is being moved rapidly and data is being fed to the computer at a high input rate.

After the data is received by the digitizer card, each data point is translated into a more useful format (in this case ASCII X, Y, and Z coordinates with sign) and stored in a data file in the PC for future use. When copies of the digitized template need to be scribed, the stored data points can easily be recalled from the PC's memory system.

The present invention provides easy PC interface with the digitizer apparatus. All the required circuitry needed to receive the encoded scaling pulses, translate those pulses for TTL input, count and associate a positive or negative sign with the encoded pulses, and translate the count number into ASCII format, can be placed on a single digitizer card plugged into an interface card slot of a standard PC. The digitizer card also provides the circuitry necessary for the operator to communicate commands to the digitizer from the PC.

With proper programming, the PC can directly read and manipulate the data file of recorded points. The file of stored data points is typically post-processed to place the data in the proper format for driving a numerically controlled ("N/C") router or cutter for the purpose of reproducing the previously digitized part. In addition, the PC can be reprogrammed to perform other functions such as change the recording mode during the digitizing operation, import or export data, edit and manipulate the stored data, or post-process the data for different kinds of N/C routers.

An advantage of the present invention is that the data points are translated into and stored in ASCII format. Consequently, the data can be directly viewed on the PC screen as normal English text, and is compatible with virtually any commercially available editor or word processor. This feature allows easy inspection and modification of a stored digital image.

The present invention also provides an improved method of optimizing or compressing the data file stored in the PC memory. After the original digitized points are recorded in the PC's memory, the optimizing routine discards unnecessary data points from the stored data file without creating a second data file. As each data point is retained or discarded, the original data file is updated to produce an optimized file containing only the necessary data points. The method employed in the optimizing routine of the present invention discards the maximum number of digitized data points in the fastest possible time without substantially altering the original digitized path. As demonstrated by the following procedure, the optimizer routine is relatively simple and does not require extensive calculations. The optimizing routine includes the following steps:

1) A direction vector is established through the first two recorded points stored in the original file;
2) A tolerance band using a predetermined offset is established on either side and parallel to the direction vector;
3) The perpendicular distance between the next succeeding point and the direction vector is calculated; and
4) If the point falls outside the tolerance band, a new direction vector is established using that point and the immediately preceding point; otherwise, if the point falls within the tolerance band, the point is discarded and the procedure is repeated using the original direction vector and the next succeeding point.

Accordingly, with the exception of the first and last points, the points lying along a substantially straight line (within the bounds of the tolerance band) are discarded from the data file.

Thus, the present invention provides an efficient and economical solution to the problems involved in digitizing complex shapes. Other features and advantages will become apparent in the detailed description which follows.

BRIEF DESCRIPTION OF THE DRAWINGS

The preferred embodiments of the invention will now be described by way of example and with reference to the accompanying drawings, in which:

FIG. 4b is a timing diagram of the clock generator circuit shown in FIG. 4a.

FIG. 5b is a timing diagram associated with the synchronizer circuit shown in FIG. 5a.

FIG. 5c is a table relating the input pins to the output pins of the dual 1-of-4 data selector shown in FIG. 5a.

FIG. 6c is a table of representative ASCII values generated by the circuit shown in FIG. 6a.

FIG. 8b is a table of PC output commands.

FIG. 8C is a table of possible data transfers from the digitizer card to the PC including function request signals.

DETAILED DESCRIPTION OF THE PREFERRED EMBODIMENTS

Figure 1:
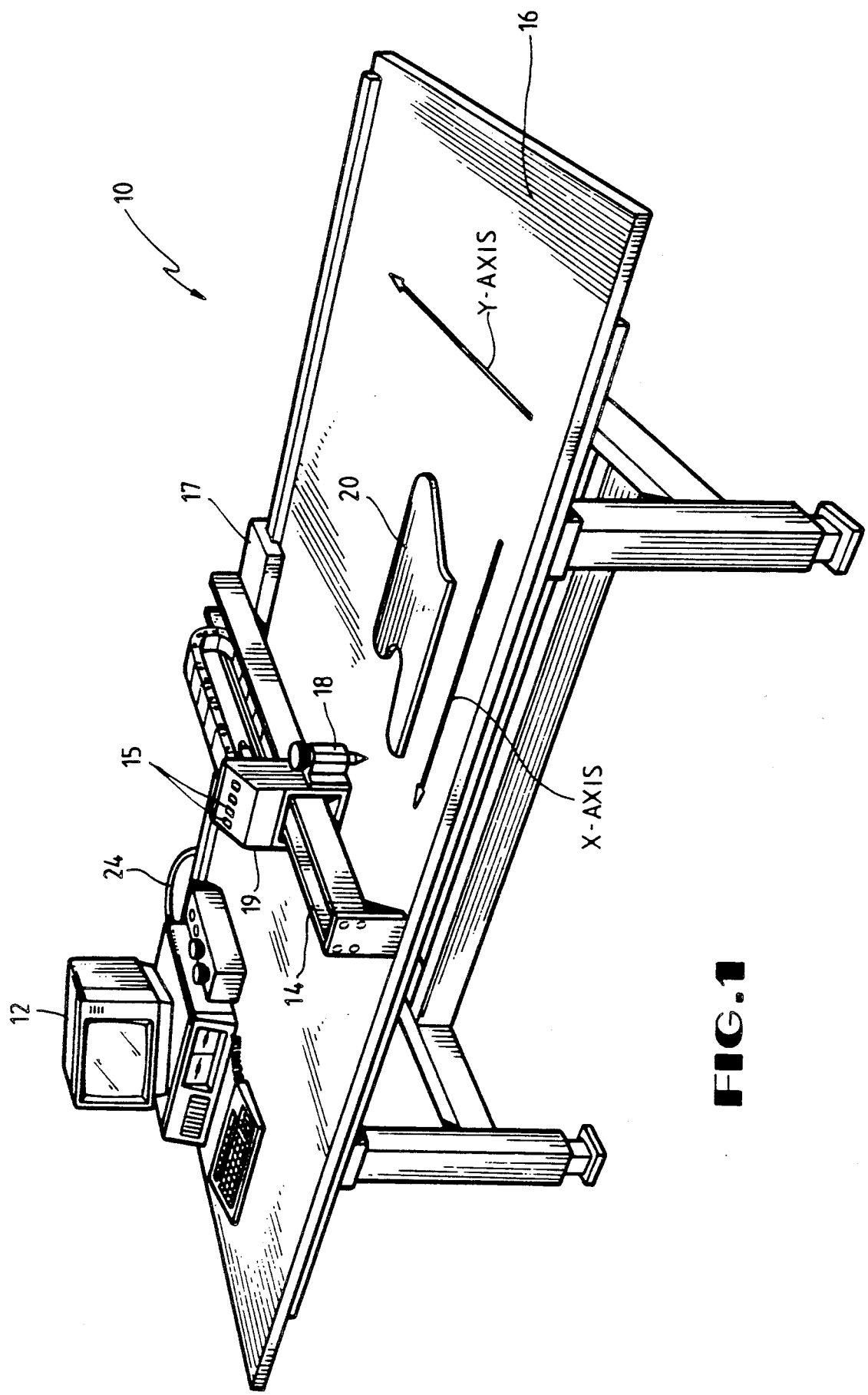
FIG. 1 is an illustration of a two-dimensional version of the present invention.

FIG. 1 illustrates a two dimensional embodiment of the present invention. The disclosed invention may also be constructed to measure and record points in three dimensions. However, for the sake of explanation, a two-dimensional system is assumed unless otherwise indicated in the following discussion. Also, since similar circuitry is required for each axis of the system, the discussion will typically refer to circuitry associated with only one exemplar axis. Further, an operator of the present invention has the option of recording points manually or automatically by selecting the appropriate mode; the automatic digitize mode is assumed unless otherwise indicated.

In FIG. 1, a digitizing system 10 includes an "IBM"-compatible personal computer (PC) 12. The PC is specially programmed to perform various functions necessary to this invention. Various software modules used in connection with the preferred embodiment of the present invention are included in the appendixes 1-9 attached hereto. In the following description, references to the PC 12 are generally intended to refer to the combination of hardware and necessary software which make up the PC 12 and enable it to function in the environment of this invention.

The digitizing system 10 also includes a moveable arm 14 slidably connected to a two dimensional planar table 16. In the preferred embodiment, the digitizer table 16 is a 48" by 120" aluminum table with a working area of 39" by 101". Mounted on the rear of the table is a recirculating ball guideway 17. This guideway 17 provides the X-axis plane, connects to the X axis scale (not shown), and carries the Y axis carriage arm 14, Y axis digital scale (not shown), stylus head, and function control box 19. Attached to the moveable arm 14 is a stylus head that carries the tracing stylus 18. Several styli are available for different diameter cutters and for hole centering. During the tracing routine, electrical signals representing stylus movement are transmitted to a digitizer card, connected to and located within the PC 12, through a cable 24 connecting the digitizer arm 14 with the PC 12.

Figure 2:
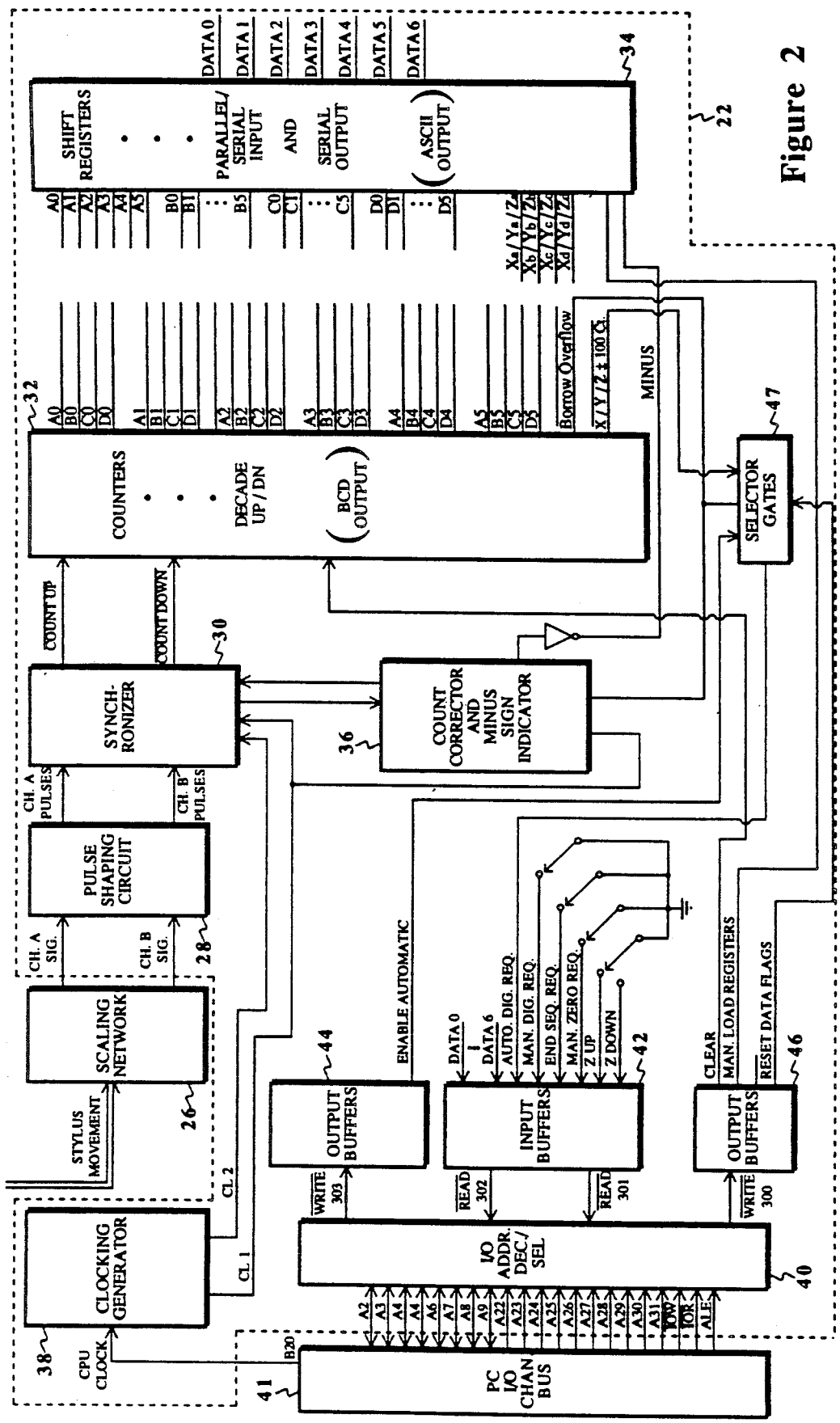
FIG. 2 is a block diagram of the digitizer card apparatus functionally illustrating the circuitry associated with one axis of the present invention.

FIG. 2 is a block diagram of the digitizer card 22 capable of being plugged into an expansion slot of the PC 12. FIG. 2 illustrates the circuitry associated with one axis of a two or three dimensional digitizing system. Prior to beginning the digitizing process, the operator selects the digitizing mode (either manual or automatic) from a menu generated by the PC 12. Once a mode has been selected, the operator controls the system by moving the stylus 18 and by pressing one or more of the buttons 15. Thus, after mode selection, the PC 12 keyboard is preferably non-functional until the operator presses the END SEQUENCE REQUEST button on the digitizer console.

As the stylus 18 is displaced about the template 20, channel A and channel B signals are generated by a scaling network 26 located on the moveable arm 14. Channel A and B signals are thereafter transmitted through the cable 24 to a pulse shaping circuit 28 located on the digitizer card 22. The pulse shaping circuit 28 transforms low-level sinusoidal waveforms of channel A and channel B signals into TTL-level channel A and channel B pulses respectively. A synchronizer 30 for each axis receives the stream of TTL-level pulses, synchronizes them with the clocking frequency of the PC 12, and decodes them into direction counts. Depending upon the direction of travel of the stylus, COUNT-UP or COUNT-DOWN pulses are generated by the synchronizer 30.

The COUNT-UP and COUNT-DOWN pulses must be counted so that the stylus 18 displacement can be determined. Counting is accomplished by a cascaded series of six decade up/down counters 32 having carry and borrow capabilities. To achieve Binary Coded Decimal (BCD) output, each counter is weighted or assigned a decimal value ten times the value of the previous decade counter. Thus, outputs $A_0$, $B_0$, $C_0$, and $D_0$ are weighted 1, 2, 4, and 8 respectively, output $A_1$, $B_1$, $C_1$ and $D_1$ are weighted 10, 20, 40, and 80 respectively, and so on, for all outputs through $A_5$, $B_5$, $C_5$, and $D_5$.

After a string of 100 COUNT-UP or COUNT-DOWN pulses for any axis have been counted, a signal (in the case of the X axis and positive counts, the signal would be "X+100 Ct.") is sent to the selector gates 47 which in turn generates an AUTOMATIC DIGITIZE REQUEST. During a digitizing operation, the PC 12 checks the status of the input buffers 42 at regular intervals. When the PC 12 recognizes the AUTOMATIC DIGITIZE REQUEST, the steps necessary for recording a data point are initiated. One hundred COUNT-UP or COUNT-DOWN pulses closely approximate a distance of 0.03937 inches along the X, Y, or Z axis. Of course greater or fewer than 100 counts could be used to trigger an AUTOMATIC DIGITIZE REQUEST depending upon the desired resolution of the system, memory capacity, etc.

After the AUTOMATIC DIGITIZE REQUEST is recognized, the PC 12 generates the LOAD REGISTERS command via output buffers 46 which causes the series of parallel/serial input and serial output shift registers 34 to accept the BCD count from the counters 32. The counting function of the counters 32 is not interrupted during this process.

Each of the shift registers 34 receives 8 bits of parallel data and shifts the bits out one at a time in conjunction with the SHIFT command generated by the PC 12. Various of the inputs to the shift registers 34 are hard-wired to either a logic 1 or logic 0 to produce the correct ASCII value. The shift registers 34 transform the BCD count data $A_0$ through $D_5$ into ASCII format by shifting parallel-inputted count data $A_0$–$A_5$, $B_0$–$B_5$, $C_0$–$C_5$, and $D_0$–$D_5$ out of each shift register one bit at a time resulting in a 7-bit ASCII word consisting of DATA 0, DATA 1, DATA 2, DATA 3, DATA 4, DATA 5, and DATA 6. The high order ASCII bits 4, 5, and 6 are generated from a series of the shift registers 34 that are hard-wired to produce the correct bit values for DATA 4, DATA 5, and DATA 6. In addition to parallel input capabilities, shift registers 34 can also receive serial inputs $Y_{a-d}$ and $Z_{a-d}$ that can be appended to the end of the output DATA 0-6 pulses. This feature is used in the preferred embodiment to transfer the DATA 0, DATA 1, DATA 2, and DATA 3 signals from the shift registers for the Y axis (and Z axis if present) to the shift registers 34 for ASCII output. This feature is described in more detail below.

The operator can press one of the buttons 15 on the digitizer console to designate the origin (0,0,0) of the axis system (MANUAL ZERO REQUEST). If the stylus 18 should happen to travel into the minus area of the X, Y, or Z axis, a BORROW OVERFLOW signal indicating a count less than zero, will be sent from the counters 32 to a count corrector/minus sign indicator 36. The negative count or BORROW OVERFLOW count sent from the counters 32 will activate the count corrector/minus sign indicator 36, which forces two up-counts from the synchronizer 30 while simultaneously setting the bits of the shift registers 34 (via the MINUS signal) for generating an ASCII minus sign. Thus, in this case, when the DATA 0-6 output is read, an ASCII minus sign character will precede the corresponding stylus 18 displacement value in either the X, Y, or Z direction.

A clocking generator 38 is used to transform the clock signal used by the CPU of the PC 12, into two clock pulses CL1 and CL2. While the pulse width of CL1 and CL2 are equal, they are out of phase with one another and occur at one quarter the clocking frequency of the CPU clock. CL1 is used to step the synchronizer 30 and the count corrector/minus sign indicator 36, whereas CL2 is used to clock the output of the synchronizer 30.

The digitizer card 22 is easily interfaced with the PC 12. The PC 12 accesses the digitizer card 22 via four I/O address ports H303, H302, H301, and H300 and the PC I/O Channel Bus 41 all associated with a standard PC. I/O port addresses H300 and H303 are used as dedicated write-only buses for transferring information from the PC 12 to the digitizer card 22, while ports H301 and H302 are used as read-only buses for transferring ASCII information from the shift registers 34 to the PC. Through program control, an address port can be selected by the I/O address decoder/selector 40 and then read from or written to by the PC. If, for example, port address H302 is selected, ASCII-formatted DATA 0-6 from shift registers 34 can be received from input buffer 42 and read from the H302 port address by the PC (see FIG. 8C). If H301 is selected, the AUTOMATIC DIGITIZE REQUEST, MANUAL DIGITIZE REQUEST, END SEQUENCE REQUEST, Z-UP, and Z-DOWN signals can be read from input buffer 42. However, if the H300 or H303 port address is selected, then certain commands such as ENABLE AUTOMATIC, CLEAR, LOAD REGISTERS, or RESET FLAGS (see FIG. 8b) may be sent from the PC 12 via output buffers 44 and 46 to the digitizer card 22.

Figure 3:
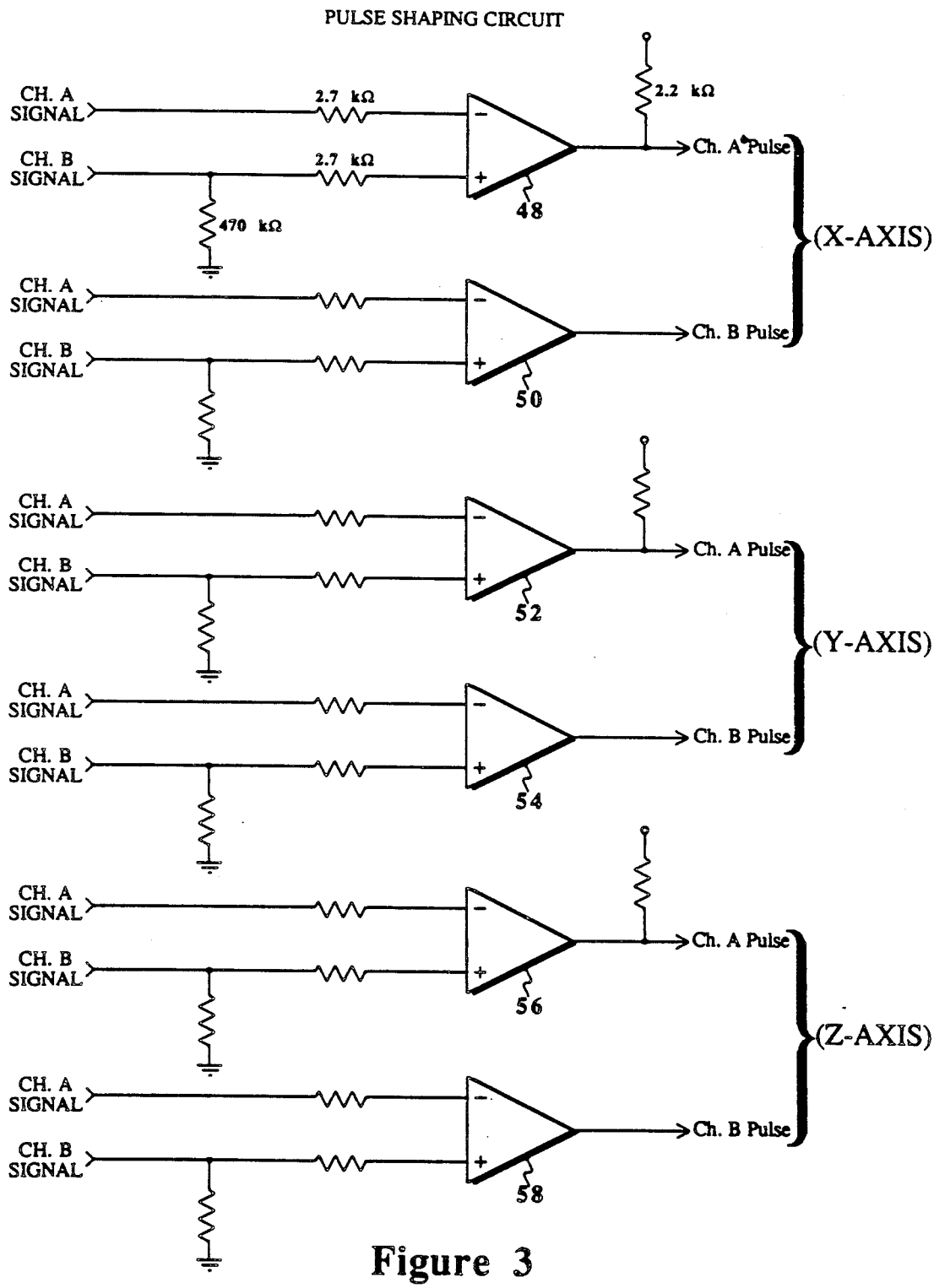
FIG. 3 is a circuit schematic diagram of the pulse shaping circuit.

FIG. 3 illustrates the pulse shaping circuit 28 used in transforming low-level sinusoidal inputs into TTL compatible channel A and B signals. In the preferred embodiment, Hidenhain digital scales are used to generate the signals representative of stylus displacement. Of course, other brands of scales or rotary encoders may be used, provided they output the required quadrature signals responsive to stylus movement on channels A and B. The signals generated by the digital scaling network 26, and corresponding with the stylus 18 movement, are approximately plus or minus one-half volt which is insufficient to drive TTL inputs. Thus these inputs are amplified to TTL levels of +5 volts and 0 volts by comparators 48, 50, 52, 54, 56, and 58. Commercially available part number LM 339 can be used for the comparators. When the sinusoidal input into the plus side of a comparator is positive with respect to ground and the sinusoidal input into the negative side of the comparator is negative, a +5 volt pulse will be generated on the output of the comparators. Conversely, as the sinusoidal inputs switch so that the input into the plus side is negative and the negative side positive, the output will switch to 0 volts.

Stylus 18 movements along the X-axis are received by comparators 48 and 50, and the TTL outputs appear as channel A pulses and channel B pulses phase shifted depending on whether the X-axis movement is positive or negative. Likewise, stylus 18 movements along the Y and Z axes are received by comparators 52, 54 and 56, 58 respectively and the TTL outputs appear as channel A pulses and channel B pulses phase shifted depending on the direction of the movement. For a given axis, channel B pulses will lead channel A pulses by a 90° phase relationship when the stylus displacement is positive for that axis.

Figure 4A:
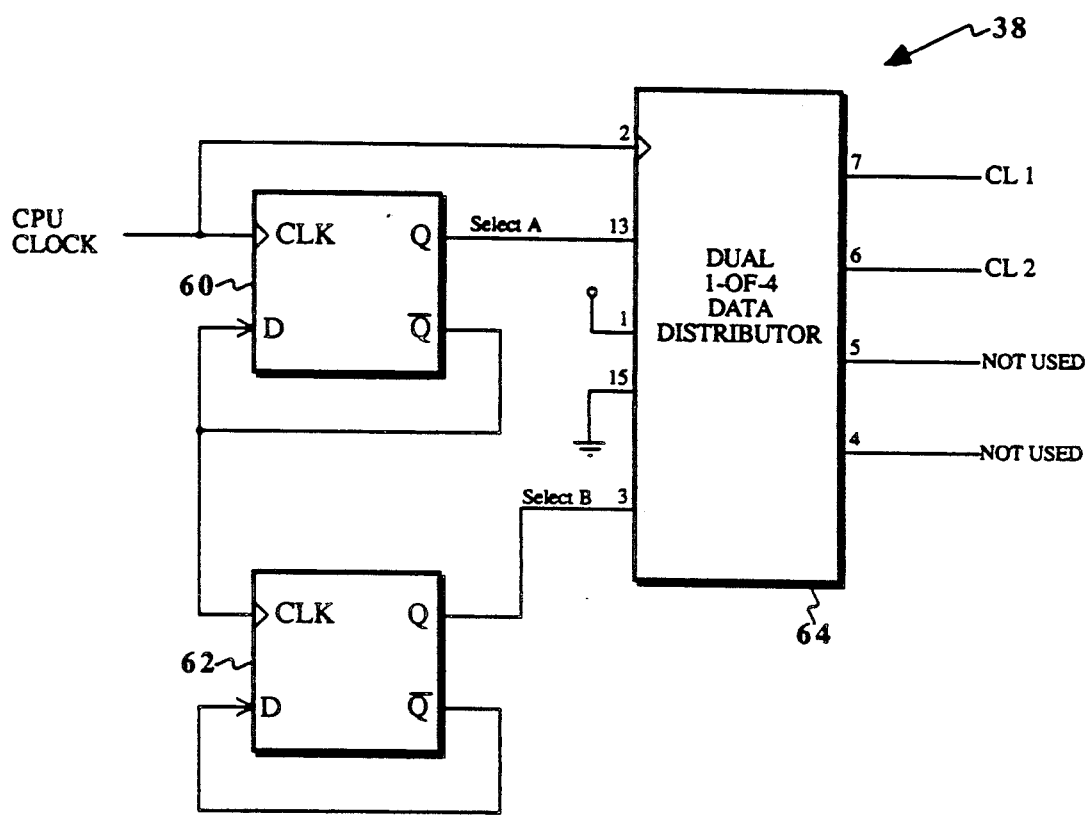
FIG. 4a is a diagram of the clocking generator circuit.

FIG. 4a is a circuit diagram illustrating the clocking generator 38. The clocking generator 38 is used to generate clocking signals CL1 and CL2. Clocking signals CL1 and CL2 are generated by a pair of D-type edge-triggered flip flops 60 and 62 connected to a dual 1-of-4 data distributor 64. The two flip flops 60 and 62 are connected in series so that the $\overline{Q}$ output and D input of FF 60 is connected to the CLK input of FF 62. Flip flop 60 is clocked by the CPU internal clock. Flip flop 62 is clocked by the D input and $\overline{Q}$ output of FF 60. Whenever the CPU clock changes from a low to a high state, data on the D input pin and $\overline{Q}$ output of FF 60 is transferred to the Q output of FF 60. Furthermore, low-to-high changes on the D input and $\overline{Q}$ output of 60 causes data on the D input and $\overline{Q}$ output of FF 62 to be transferred to the Q output on FF 62.

By connecting flip flops 60 and 62 in this fashion, a divide-by-two and a divide-by-four circuit configuration is established. As illustrated in the FIG. 4b timing diagram, the Q output of FF 60, or SELECT A, is ½ the frequency of the CPU clock. In addition, the clocking signal on the Q output of FF 62, or SELECT B, is ¼ the frequency of the CPU internal clock. By forcing the SELECT A and SELECT B clocking frequencies to be ½ and ¼ respectively of the CPU clocking signal, four possible signal combinations are generated.

As depicted in FIG. 4a, the four possible signal combinations generated on the Q outputs of 60 and 62 are received on a pair of select input pins 13 and 3 of a dual 1-of-4 data distributor 64. In the preferred embodiment, the dual 1-of-4 data distributor 64 is a commercially available 74LS155 integrated circuit. The CPU clock input feeds pin 2 and a high input level is placed on pin 1 to enable output pins 4, 5, 6 and 7 of the 74LS155. Output pins 0, 1, 2 and 3 are disabled since pin 14 is not connected and pin 15 is grounded.

Figure 4B:
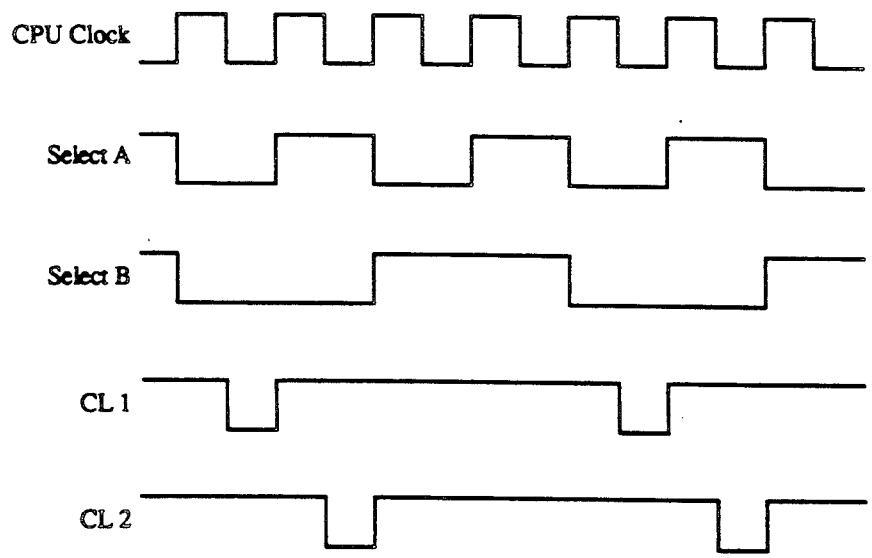

The timing diagram of FIG. 4b illustrates the output clock signals on pins 6 and 7 in relationship to the CPU clock select A and B address lines. CL1 and CL2 represent synchronized, non-overlapping pulses. CL3 and CL4 are present on output pins 5 and 4 respectively but are not used.

Figure 5A:
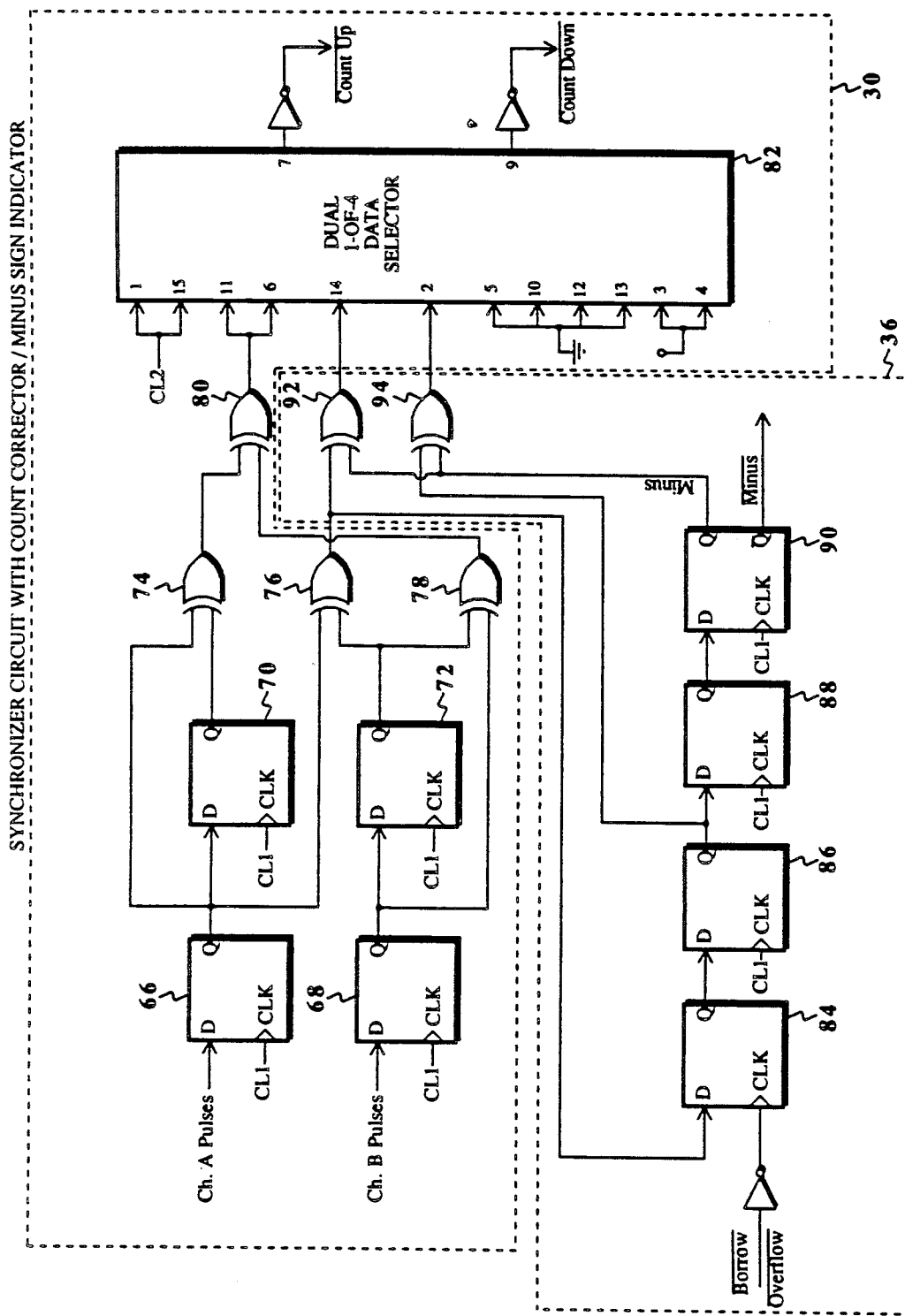
FIG. 5a is a diagram of a synchronizer circuit with count corrector/minus sign indicator of the present invention.

FIG. 5a is the circuitry for one axis of the synchronizer 30 and the count corrector/minus sign indicator 36. The synchronizer 30 functions to synchronize the Channel A and B pulses for one axis (see FIG. 3) with the CPU clock, and decode them into either COUNT-UP or COUNT-DOWN direction counts. If the A pulse leads the B pulse, the count is descending, and if B leads A, the count is ascending. If A and B change states together, no count will be generated. (See FIG. 5b).

The synchronizer 30 utilizes four D-type flip-flops 66, 68, 70, 72, four two-input exclusive-or (XOR) gates 74, 76, 78, 80, and a dual 1-of-4 data selector 82. A single commercially available integrated circuit, part number 74LS174, is utilized to provide the needed D-type flip-flops 66, 68, 70, 72, and a commercially available integrated circuit, part number 74LS153, is used for the dual 1-of-4 data selector in the preferred embodiment. Each of the four flip-flops is clocked by CL1. The D-input of flip-flop 66 receives channel A pulses from the pulse shaping circuit 28, while the D-input of flip-flop 68 receives channel B pulses.

The D inputs of flip-flops 70 and 72 receive the Q outputs from flip-flops 66 and 68 respectively. Also connected to the Q outputs of 66, 68, 70, and 72 are three XOR gates 74, 76, and 78. The outputs of gates 74 and 78 are connected to the inputs of XOR gate 80, which in turn feeds two data input pins 6 and 11 of the dual 1-of-4 data selector 82.

Working in conjunction with the synchronizer 30 is the count-corrector/minus-sign indicator 36 illustrated in FIG. 5a. The count corrector/minus sign indicator 36 utilizes four D-type flip flops 84, 86, 88, and 90 connected in series, and two exclusive-or gates 92 and 94. The count corrector/minus sign indicator 36 causes a 2's complement count correction to occur whenever the stylus 18 moves into the negative portion of the associated axis. When a negative data coordinate is first encountered, the counters 32 (see, e.g., FIG. 6a) are decremented below the zero count, forcing the counters 32 to send an inverted BORROW-OVERFLOW signal to the CLK input of FF 84.

Upon receiving a BORROW-OVERFLOW signal from the counters 32 at the clock input pin to FF 84, the output of XOR gate 76 is clocked to the Q output of FF 84. The next CL1 clock pulse latches the output of FF 86 to an input of XOR 94 and then, two CL1 clock pulses later, the output of FF 90 is transferred to the inputs of XOR 92 and XOR 94 as the "minus" signal. If, for example, the channel A input to FF 66 leads the channel B input to FF 68, and the Q output of FF 86 is at logic 1, then after two CL1 signals, the $\bar{Q}$ output of FF 90 sends a MINUS signal to the shift registers 34 (see FIG. 6A). The MINUS signal sent to the shift registers 34 will cause an ASCII minus sign to be generated in association with the value for that axis.

The outputs of exclusive-or gates 92 and 94 feed pins 14 and 2 respectively of the dual 1-of-4 data selector 82. The signals placed on pins 14 and 2 act as address selectors in which the signals on one pair of the eight input data pins are transferred to the output pins 7 and 9 upon receipt of a CL2 clock pulse on pins 1 and 15. Input data pins 3, 4, 5, and 6 are associated with the COUNT-UP output pin 7. Input data pins 10, 11, 12, and 13 are associated with the COUNT-DOWN output pin 9. In the preferred embodiment, data pins 5, 10, 12, and 13 are tied to ground. Data pins 3 and 4 are tied to a logic 1. Data pins 11 and 6 are tied to the output of XOR 80. FIG. 5c shows the relationship between the inputs and outputs of the dual 1-of-4 data selector 82 assuming a proper CL2 clock transition.

If both channel A and B inputs to the synchronizer 30 have been at a 0 logic state for at least two clock cycles, then FF 66 and FF 68 will have a logic 0 on their Q outputs. Likewise, FF 70 and FF 72 will have a logic 0 at their Q output pins. Thus, both inputs to XOR gates 74 and 78 will be at logic 0, forcing their outputs to logic 0. Also, since the outputs of FF's 66 and 72 are at logic 0, both inputs to XOR 76 are 0 and its output is 0.

Now assume that the channel A input goes to a logic 1. Then on the next low-to-high CL1 clock edge, FF 66 will output a logic 1. Because of this, XOR gates 74 and 76 both have one input at logic 1 and one input at logic 0. XOR gate 74 will output a logic 1 to XOR gate 80 which will now have one input at logic 1 and the other at logic 0. The output of XOR gate 80 will now go to a logic 1 indicating one count has occurred. The output of XOR gate 76 will also be at logic 1, indicating that the channel A input signal leads the channel B input signal and, therefore, the count is in a negative direction.

XOR gate 76 will also output a logic 1 to XOR gate 92 which will now have one input at logic 1 and the other at logic 0. Thus, XOR 92 will output a logic 1. Now pins 2 and 14 of the dual 1-of-4 data selector 82 are at logic 0 and logic 1 respectively, thereby selecting input data pin 11. Since pin 11 is at a logic 1, when CL2 transitions from a high-to-low, a logic 1 or COUNT-DOWN signal is placed on pin 9 (as shown in FIG. 5c) as expected since the channel A pulse is out of phase with and leads the channel B pulse. The COUNT-DOWN signal will persist for the duration of CL2.

If, on the next CL1 clock cycle, channel A is still at logic 1, FF 66 will continue to output a logic 1 and FF 70 will also output a logic 1. Now both inputs to XOR 74 will be at logic 0 forcing its output to logic 0. Consequently, XOR 80 will output a logic 0 while XOR gates 76 and 92 continue outputting a logic 1. Since pin 14 is at logic 1, pin 2 is at logic 0, and pin 11 is at logic 0, no count pulse will be generated (see FIG. 5c).

Figure 5B:
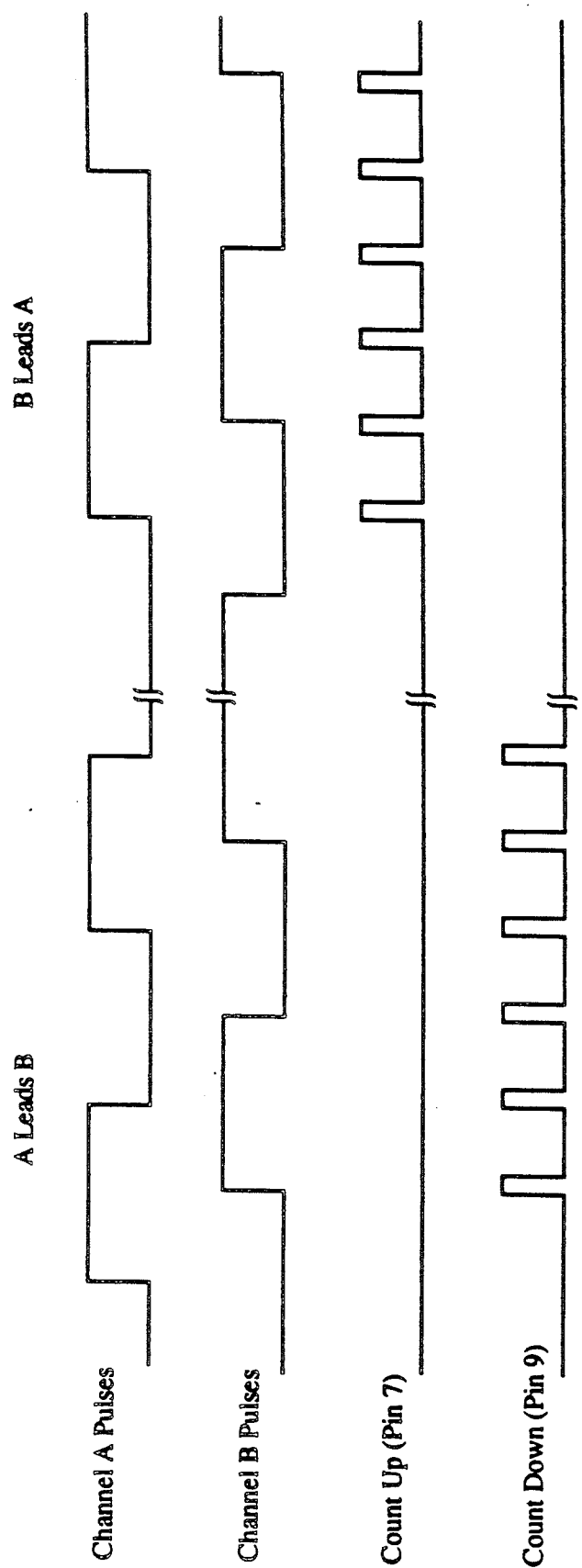

FIG. 5b is the synchronizer 30 timing diagram illustrating the COUNT-UP and COUNT-DOWN pulses in relation to the Channel A and Channel B input pulses. The COUNT-UP and COUNT-DOWN pulses occur when CL2 is strobed low subsequent to CL1. As shown, if Channel A pulses lead Channel B pulses a COUNT-DOWN signal is generated. Conversely, if Channel B pulses lead Channel A pulses, a COUNT-UP signal is generated.

Figure 6A:
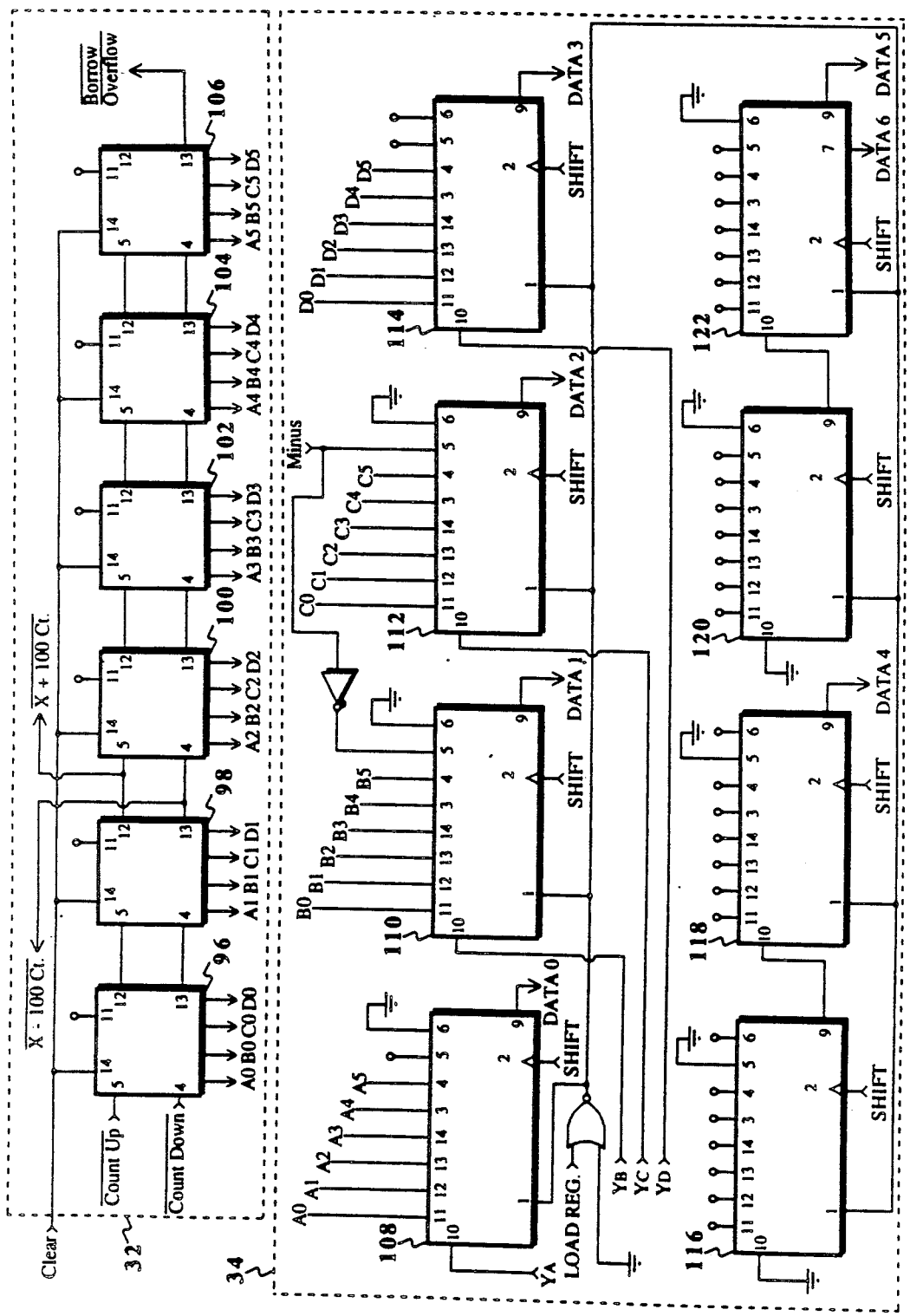
FIG. 6a is a diagram of the up/down counters and parallel/serial shift registers for the X-axis.

FIG. 6a is a circuit diagram of the counters 32 and shift registers 34 all associated with the x-axis in the preferred embodiment. The counters 32 are composed of six decade up/down counters 96, 98, 100, 102, 104 and 106 connected in series. A commercially available integrated circuit, part number 74192, is used in the preferred embodiment for each decade up/down counter. By hardwiring pin 11 to a logic 1, each counter is permanently enabled to accept either COUNT-UP pulses on input pin 5 or COUNT-DOWN pulses on input pin 4. If the number of COUNT-UP pulses entering counter 96 exceed ten, the excess pulses are carried over from output pin 12 to input pin 5 of counter 98. This process continues until the counters 32 are cleared by the CLEAR command generated by the PC 12. The counters 32 are cleared by the CLEAR input which is generated by the PC 12 when a MANUAL ZERO REQUEST is recognized by the PC 12.

If the stylus 18 travels into the negative portion of a given axis, the counters 34 decrement one count on each low-to-high transition of the COUNT-DOWN input pulse to a negative value and cause a BCD nine to be entered into the counters. An overflow nine entry in the counters 32 will activate the BORROW-OVERFLOW signal on pin 13 of counter 106, thereby causing the count-corrector/minus-sign indicator 36 (see FIG. 5a) to do two things: 1) it will correct the erroneous nine count by sending two COUNT-UP pulses to the counters 32 so as to correct the nine count to the proper one count, and 2) it will generate the MINUS bar signal on the $\bar{Q}$ output pin of FF 90 which then gets inverted and sent to the shift registers 34.

Associated with each counter 96, 98, 100, 102, 104, and 106 are weighted outputs $A_n$, $B_n$, $C_n$, and $D_n$. Output $A_n$ is weighted as 1, $B_n$ weighted as 2, $C_n$ weighted as 4, and $D_n$ weighted as 8. In addition, each counter is also weighted, that is, each counter is assigned a decimal value ten times the value of the previous counter. Therefore, outputs $A_0$, $B_0$, $C_0$, and $D_0$ of counter 96 count pulses from 0 through 9. Outputs $A_1$, $B_1$, $C_1$, and $D_1$ of counter 98 count pulses from 10 through 90; outputs $A_2$, $B_2$, $C_2$, and $D_2$ of counter 100 count pulses from 100 through 900; and so on. Up to a maximum of 1,000,000 pulses can be counted in BCD format in counters 96 through 106. Each time the counters 32 reach a value of 100 the "X + 100 Ct." or "X - 100 Ct."

signal (depending upon the sign of the count) is generated from counter 98. This signal indicates that the stylus has moved 100 counts (approximately 0.03937 inches) along the positive or negative X axis and further indicates that the PC 12 should record the coordinates of a data point. A similar set of counters (see FIG. 6b) is provided for the Y axis (and Z axis in a three-dimensional system). Thus, under normal operating conditions in a two dimensional system, a point is recorded whenever the stylus moves approximately 0.03937 inches in either the X or Y axis.

The outputs of each counter $A_n$ through $D_n$, are in Binary Coded Decimal (BCD) format and are connected to shift registers 34. Shift registers 34 are associated with the X-axis and shift registers 234 (see FIG. 6b) are associated with the Y-axis in a preferred embodiment of the present invention. Shift registers 34 comprise a series of eight parallel/serial-input & serial-output shift registers 108, 110, 112, 114, 116, 118, 120, and 122. Shift registers 234 (FIG. 6b) comprise a series of four parallel/serial-input & serial-output shift registers 236, 238, 240, and 242. A commercially available integrated circuit, part number 74LS165, is used for each parallel/serial-input & serial-output shift register in the preferred embodiment. These devices parallel load eight bits and serially shift them out. The data in each of the shift registers 34 is shifted out on pin 9 from parallel input pins 6, 5, 4, 3, 14, 13, 12, and !1 respectively, and then from serial input pin 10.

Generation of the "100 Ct." signal from counters for any axis causes the AUTOMATIC DIGITIZE REQUEST signal to be generated. As mentioned previously, when the AUTOMATIC DIGITIZE REQUEST signal is recognized by the PC 12, the PC 12 generates the LOAD REGISTERS COMMAND which causes the data on the outputs of the counters 32 to be loaded into the shift registers 34. Signals $A_0$ through $A_5$ are received from counters 32 and are input in parallel into shift register 108, $B_0$ through $B_5$ are input in parallel into shift register 110, $C_0$ through $C_5$ are input in parallel into shift register 112, and $D_0$ through $D_5$ are input in parallel into shift register 114. If inputs $A_0$ through $D_5$ represent count data for the X-axis, then Y-axis and Z-axis count data can be serially input into pin 10 of each shift register 108 through 114, and appended at the end of the X-axis data stream, so that the entire X, Y, and Z-axis data stream can be shifted out of pin 9 of each shift register 108 through 114.

In order to output the data from the shift registers 34 in ASCII format, there must be seven bits associated with each output character. Therefore, two additional parallel/serial-input & serial-output shift registers 118 and 122 are needed to provide a total of seven data outputs: Data 0, Data 1, Data 2, Data 3, Data 4, Data 5, and Data 6. Shift register 122 provides outputs for both DATA 5 and DATA 6. Shift registers 116 and 120 provide the necessary upper level ASCII bits for the Y-axis information in a two-dimensional system. The parallel input pins on shift registers 116 through 122 and pins 5 and 6 on shift registers 108, 110, 112, and 114 are hardwired high or low in order to give the correct bit state for the ASCII characters "X" and "+" or "−".

Figure 6B:
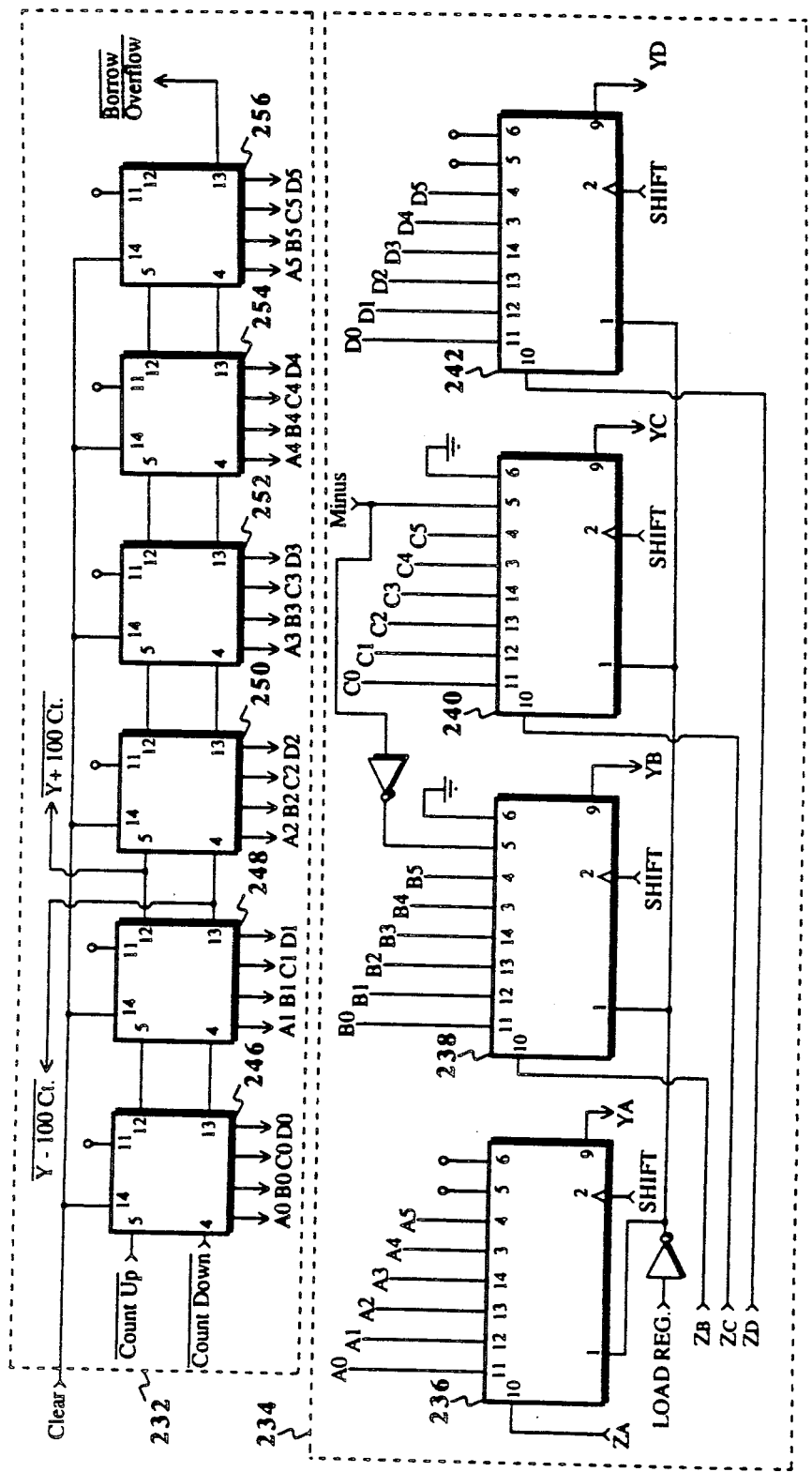
FIG. 6b is a diagram of the up/down counters and parallel/serial shift registers for the Y-axis of an embodiment of the present invention.

After the PC 12 generates the LOAD REGISTERS command, a series of 8 SHIFT commands for each axis is generated by the PC 12. The SHIFT command (see FIG. 7) is generated as a result of the READ 302 signal (FIG. 7) which causes the DATA 0–6 signals to be read by the PC 12 (see FIG. 9). The PC 12 reads the data from the DATA 0–6 outputs of shift registers 34 when the SHIFT command transitions from high to low. When the SHIFT command transitions from low to high, the data in shift registers 34 and shift registers 234 is shifted one bit position. A second set of 8 SHIFT commands shifts the data received on pin 10 of each of the shift registers 108, 110, 112, and 114 out on the DATA 0 through DATA 3 outputs. The second set of 8 SHIFT commands also shifts the hardwired data in shift registers 116 and 120 out of shift registers 118 and 122 as DATA 4, DATA 5, and DATA 6 signals. The data received on pin 10 of each of the shift registers 108, 110, 112, and 114 is generated by the Y-axis shift registers 234 as shown in FIG. 6b. Referring to FIG. 6b, note that the input to pin 10 of each of the shift registers 234 would be from the shift registers associated with the Z-axis if present in the system. If the system is two-dimensional only, then pin 10 of each of the shift registers 234 would be tied to ground.

A three dimensional system would thus require 24 consecutive READ 302/SHIFT signals and would produce the following sequence of ASCII characters from the DATA 0–6 outputs:

X(sign)nnnnnnY(sign)nnnnnnZ(sign)nnnnnn.

X is the most significant character followed by the sign ("+" or "−" in ASCII) and the count number (nnnnnn) including leading zeros. Thus, the count number can range from 000000 to 999999. If, for example, an X,Y,Z point having the value +250, −127, +26100 is digitized, the ASCII characters shown in FIG. 6c will be produced.

Typically, a point will be digitized and stored each time the stylus moves 100 counts (approximately 0.03937 inches) in any axis since a 100 count in any axis generates an AUTOMATIC DIGITIZE REQUEST signal. However, if the operator is moving the stylus very rapidly, and if the PC 12 is busy reading and storing the previous point, the distance travelled by the stylus in a given axis may exceed 100 counts before the AUTOMATIC DIGITIZE REQUEST is recognized by the PC 12. Thus, under these abnormal operating conditions, the digitized points will tend to be located somewhat further apart than the case where the stylus is being moved more slowly and each AUTOMATIC DIGITIZE REQUEST is immediately recognized and processed. Note however, that since the counters 32 and 232 comprise six BCD counters each, up to a million counts can be accumulated for each axis before data is lost. Since 100 counts approximates a distance of 0.03937 inches, one million counts approximates a distance of 393.7 inches. This configuration prevents a loss of data under extreme operating conditions, e.g., rapid stylus speed or a slow PC.

Figure 7:
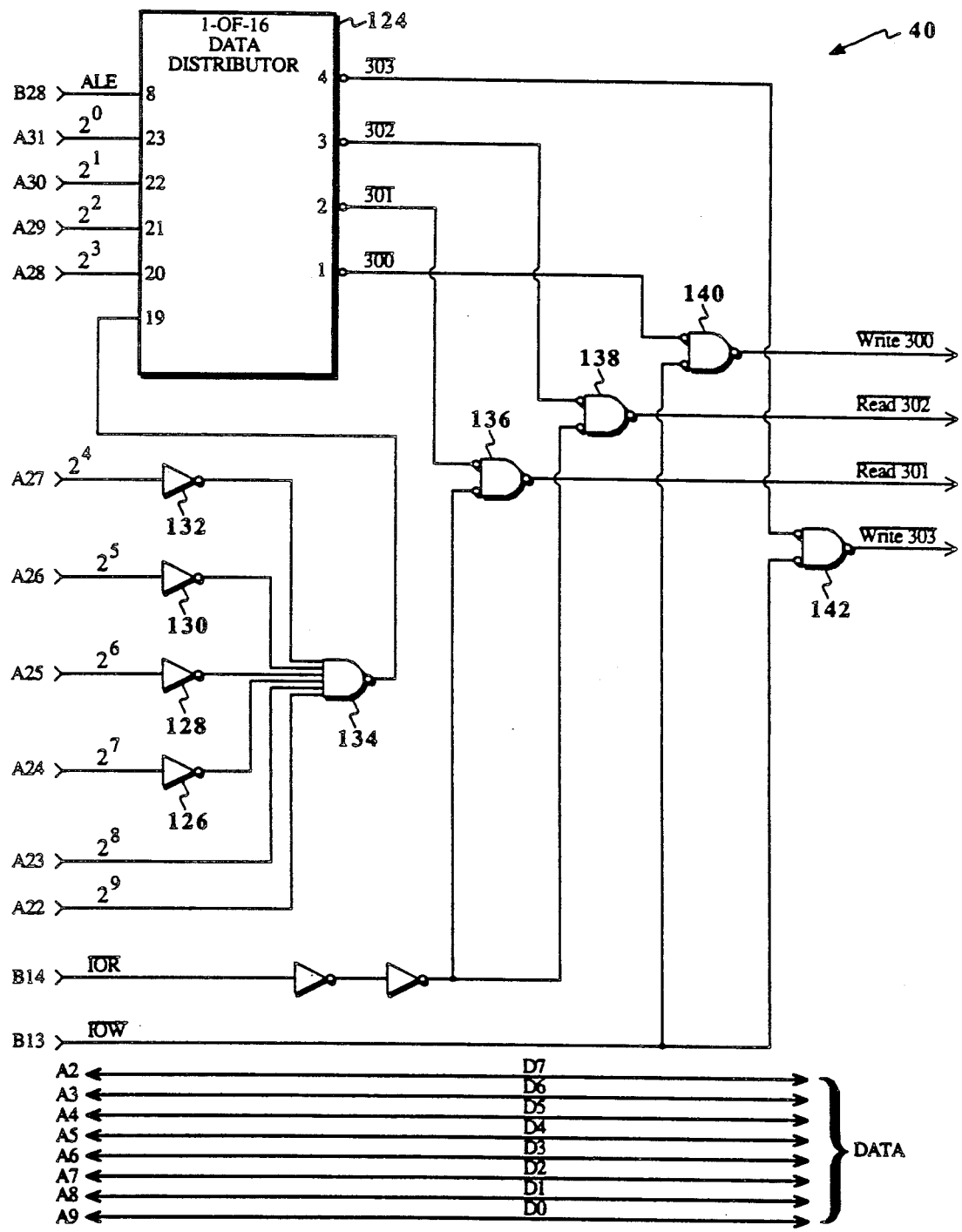
FIG. 7 is a diagram of the I/O address decoder/selector.

FIG. 7 illustrates the I/O address decoder/selector circuit 40 for decoding particular I/O port addresses of the PC 12. Input/Output ports are addresses used by the processor to communicate with devices directly. These addresses are like memory addresses but are not for storage. Ports H100 to H3FF are available on the PC's I/O channel bus 41 (see FIG. 2). In the present embodiment, the PC communicates with the digitizer card via ports H300, H301, H302, and H303. (Note: "H" denotes hexadecimal.)

The digitizer card 22 is plugged into an expansion slot in the PC. The Industry Standard Architecture (ISA) expansion slots in a standard PC each comprise a set of 62 signal lines labeled A1 through A31 and B1 through B31. These lines can be used to connect the PC to external devices not on the system board. Each ISA slot is wired to the same set of 62 I/O channel signal lines, so that all slot positions are typically identical and interchangeable. The PC I/O channel bus 41 includes 20 address lines on pins A12 through A32, eight bidirectional Data lines on pins A2 through A9, a CPU clock line on pin B20, an address latch enable (ALE) line on pin B28, and I/O Read (IOR) and I/O Write (IOW) on pins B14 and B13 respectively. Address lines A22 through A31 are utilized in the preferred embodiment.

Selection of one of the ports H300, H301, H302, and H303 is easily accomplished by use of software commands. For example the Basic programming language command INP(n) returns the byte read from machine port (n). The Basic command OUT(h,j) sends a byte of data (j) to machine port (h). In 8086 assembly language, the commands are IN and OUT. (See program listings in Appendixes 5 and 6.)

The port address is decoded by the 1-of-16 data distributor 124 and associated circuitry shown in FIG. 7. A commercially available integrated circuit, part number 74LS154, is used for the 1-of-16 data distributor 124 in the preferred embodiment. The I/O port address low order bit $2^0$ is associated with pin A31. The highest order bit necessary for addressing H300 through H303 is $2^9$ which is associated with pin A22.

When pin 19 of the 1-of-16 data distributor 124 receives a logic 0 from the output of the 6-input nand gate 134, and the Address Latch Enable (ALE) signal is present on pin 18 of the data distributor 124, one of the output pins 1–4 is selected according to the signals present on pins 28–31. If, for example, port address H300 is selected, pin 1 of the data distributor 124 outputs a logic 0 which is received on an input to AND gate 140. The write signal IOW bar from pin B13 of the PC I/O channel bus will be present on the other input to gate 140 as a result of the software command used for selecting and writing to port H300. Consequently, AND gate 140 outputs a logic 0 representing the "WRITE 300" command. The other commands "READ 301," "READ 302," and "WRITE 303" are generated in a similar fashion and are also asserted at a logic 0. Note that the READ 302 signal also generates the SHIFT signal which is used to shift the shift registers 34.

Figure 8A:
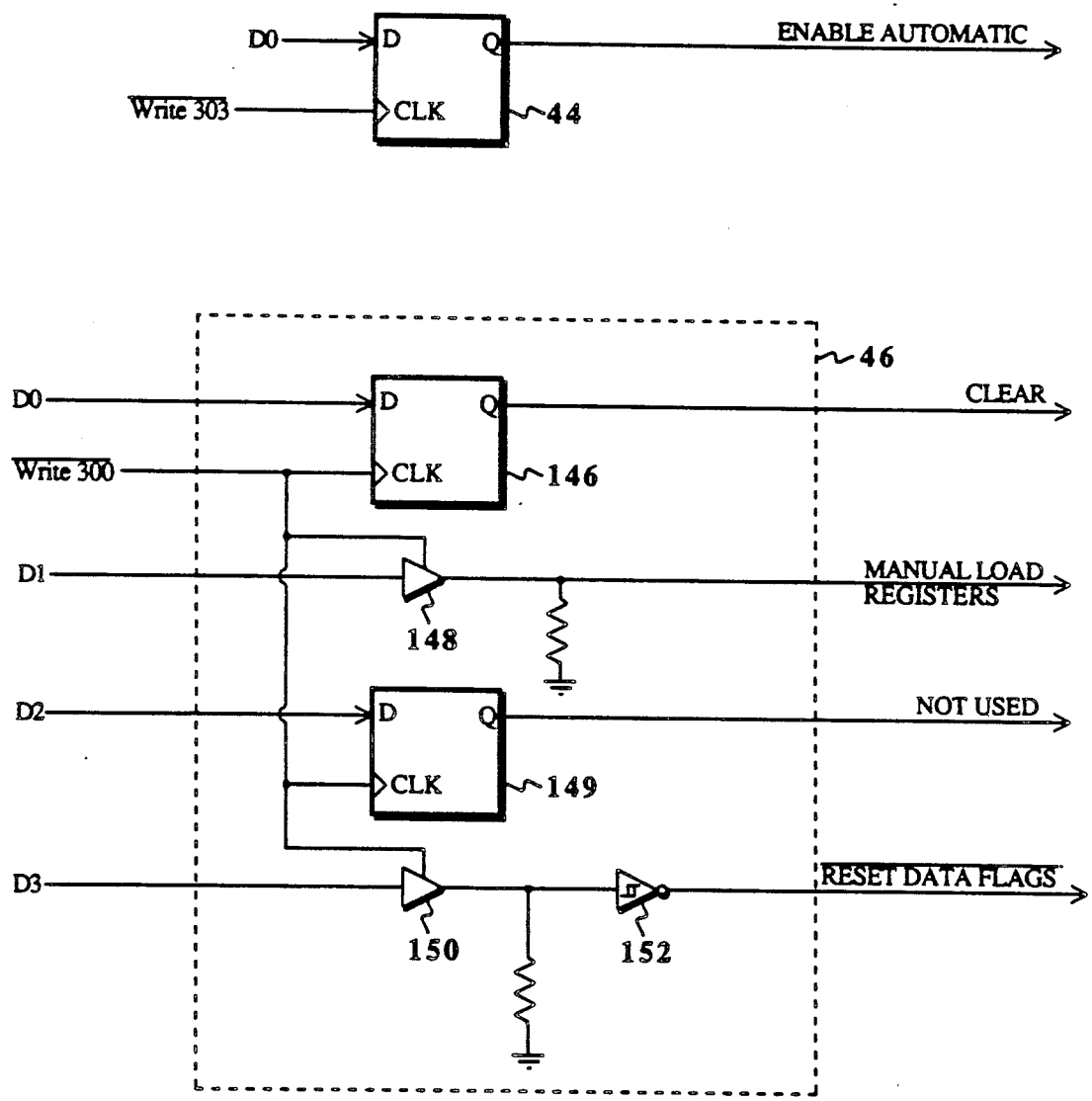
FIG. 8a is a circuit schematic diagram of the output buffer (PC-to-digitizer card).

FIG. 8A illustrates the output buffers 44 and 46 used to receive and latch commands sent from the PC 12 to the digitizer card 22. Output buffer 44 is selected when I/O port H303 is accessed via program control. The clock input to FF 44 receives the WRITE 303 bar signal from the I/O Address Decoder/Selector Circuit 40, and the D input receives a single data signal D0 from pin A9 of the PC I/O Channel Bus 41. If D0 is a logic 1, the ENABLE AUTOMATIC signal is latched by output buffer 44 and sent to the selector gates 47. ENABLE AUTOMATIC is generated when the user selects the automatic mode from a menu generated by the PC 12. ENABLE AUTOMATIC allows AUTOMATIC DIGITIZE REQUEST to be generated and therefore must be set at the start of a continuous digitize cycle.

Output buffer 46 is selected when I/O port H300 is accessed via program control and the WRITE 300 bar signal is generated. Data bits D0–D3 (from pins A6–A9 of the PC I/O Channel Bus) are received by output buffer 46. Data bits D1 and D3 are not latched. The CLEAR command is sent to the counters 32 (see FIG. 6a) when data bit D0 is selected and the clock input to FF 146 receives the positive-going edge of the WRITE 300 signal. The CLEAR command is generated when the PC 12 recognizes a MANUAL ZERO REQUEST signal. LOAD REGISTERS is sent to the shift registers 34 (see FIG. 6a) when data bit D1 is selected and amplifier 148 receives the WRITE 300 signal. This occurs after the PC 12 recognizes an AUTOMATIC DIGITIZE REQUEST signal. RESET DATA FLAGS is sent to the selector gates 47 (see FIG. 9) when data bit D3 is selected and amplifier 150 receives the WRITE 300 signal. The RESET DATA FLAGS signal is buffered by the Schmidt trigger device 152.

More than one command can be sent simultaneously by setting more than one bit in D0–D7. Thus, a software command that sends HF (decimal 15) to port H300 would send four commands (one for each bit D0–D3) to the digitizer card 22. FIG. 8B illustrates the output commands and their associated addresses that can be sent from the PC 12 to the digitizer card 22 according to the preferred embodiment of this invention.

Figure 9:
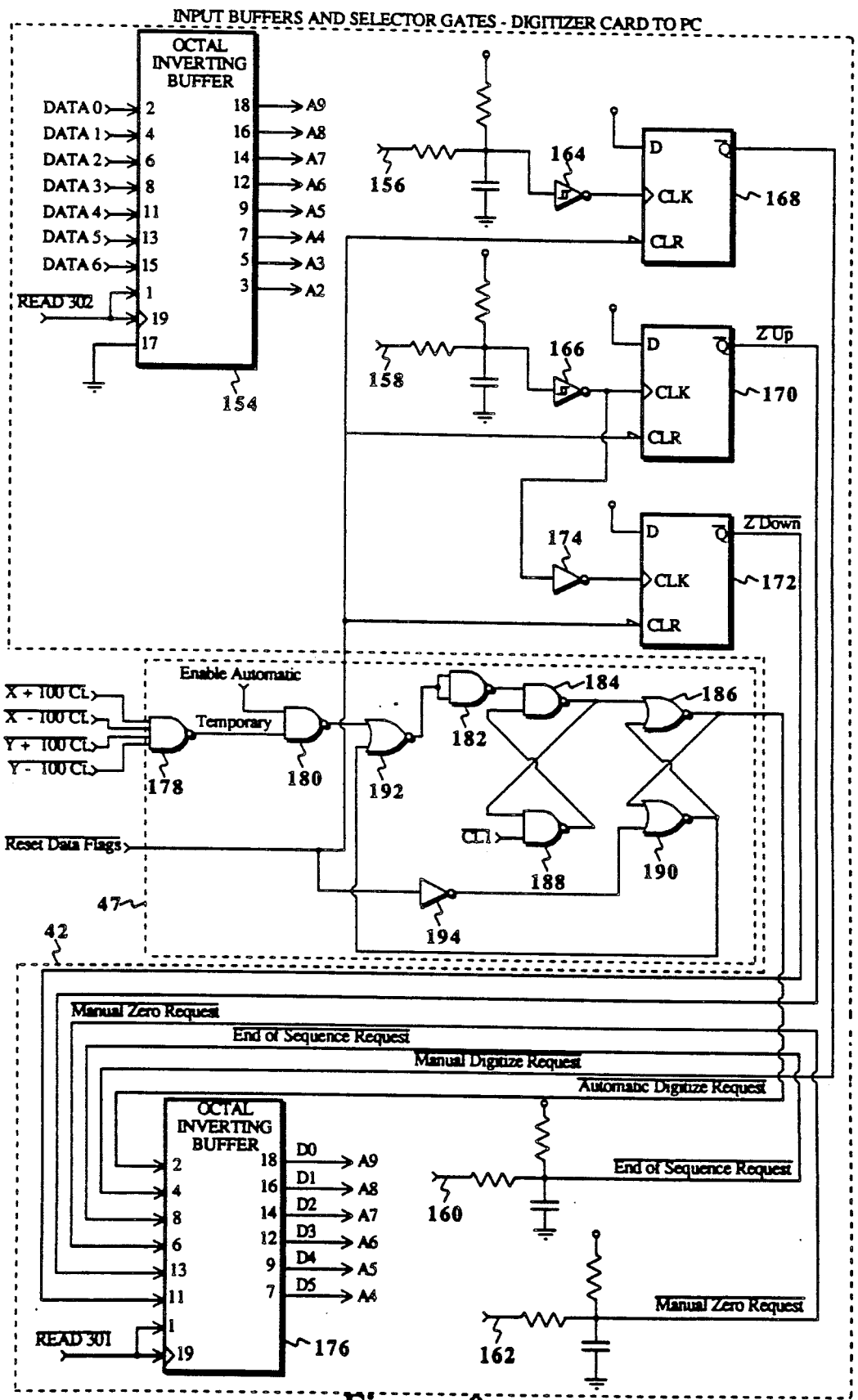
FIG. 9 is a diagram of the input buffer (digitizer card-to-PC) and selector gates.

FIG. 9 illustrates the input buffers 42 and selector gates 47 used to send data from the digitizer card 22 to the PC 12. FIG. 8C is a table of values illustrating requests and data transfers from the digitizer card 12 to the PC. Referring to FIG. 9, octal inverting buffer 154 receives the DATA 0 through DATA 6 signals representing an ASCII character from the shift registers 34. A commercially available integrated circuit, part number 74LS240, is used for the inverting buffer in the preferred embodiment. To read the ASCII DATA 0 through DATA 6 onto the PC I/O Channel Bus pins A9 through A2, the octal inverting buffer 154 is selected and enabled when I/O port H302 is accessed via program control and the "READ 302" signal is generated from the I/O address decoder/selector circuit 40. DATA 0 through DATA 6 from shift registers 34 are inverted and buffered onto I/O pins A9 through A2 respectively. The ASCII formatted data on I/O pins A9 through A2 can then be directly read by the PC 12.

By accessing I/O port H301, the PC 12 can receive various operational input signals from the digitizer card 22 via a second octal inverting buffer 176. Some request inputs to the PC are manually generated by pressing buttons 15 on the digitizer arm 14 (see FIG. 1). These inputs include: MANUAL DIGITIZE REQUEST, Z UP, Z DOWN, END SEQUENCE REQUEST, and MANUAL ZERO REQUEST. When the operator wants to either manually digitize a point while in manual digitize mode (MANUAL DIGITIZE REQUEST), signify the stylus as being up or down (Z UP, Z DOWN), signify that digitizing is complete (END SEQUENCE REQUEST), or establish a new X=0, Y=0, Z=0 origin (MANUAL ZERO REQUEST), this is accomplished by pushing buttons 15 on the digitizer's moveable arm 14 to generate the respective signals. Bounceless push-button input networks 156, 158, 160, and 162 are shown in FIG. 9 for each of the manual inputs. The PC 12 scans and processes the output of octal inverting buffer 176 at regular intervals.

Activating a push-button 15 sends a positive-going signal to the clock inputs of flip flops 168, 170, and 172. The outputs of the push button networks 156 and 158 are buffered with Schmidt trigger devices 164 and 166, and latched by FF 168 and FF 170 respectively. Since Z DOWN is the inverse of Z UP, the clock input on flip flop 172 is inverted by invertor 174.

The signals Z UP, Z DOWN, and MANUAL DIGITIZE REQUEST, must be acknowledged after they are asserted. After they are asserted, they must not be read again until the signal cycles from false to true again. Thus, after pushing a button corresponding to FF 168, 170, or 172, the request must be read by the PC and then cleared by the PC before the request can be asserted again. The request is cleared when the PC 12, via program control, sends a RESET DATA FLAGS command by accessing I/O port H300 with data bit D3 set. (See FIG. 8B). The RESET DATA FLAGS command (FIG. 9) clears flip flops 168, 170, and 172. Once the flip flop is reset, it will not set again until the clock input goes negative, then positive. This approach accomplishes contact debounce and relieves the processor of storing and comparing previous I/O scans of the input buffers 42.

The MANUAL DIGITIZE REQUEST, Z UP, and Z DOWN signal is received on the input pins of octal inverting buffer 176. Upon receiving the READ 301 bar signal, the octal inverting buffer 176 outputs the respective signals to the PC I/O Channel Bus data pins A4 through A9.

The selector gates 47 also function to receive the X, Y, and Z 100±COUNT carry (or borrow) counts from the decade up/down counter 98 (see FIG. 6a) and counter 248 (see FIG. 6b). When the stylus 18 travels 100 counts in either the X or Y direction, an X or Y±100 COUNT bar signal is sent to an input of a four (if X and Y axis) or six (if X, Y and Z axis) input NAND gate 178. The TEMPORARY output signal generated by NAND gate 178 is connected to a two-input NAND gate 180. The other input to the NAND gate 180 is connected to the ENABLE AUTOMATIC signal which is high during automatic digitizing. Thus, if any input to NAND gate 178 goes low, then the TEMPORARY signal and ENABLE AUTOMATIC signal will both be high, and a low signal will be transferred to the 2-input NOR gate 192. Since both inputs to gate 192 are low, then the output of gate 192 is high. This high signal is inverted by gate 182. The low signal thus generated from gate 182 will set the NAND gate flip-flop composed of NAND gates 184 and 188. This flip-flop will be set concurrently with CL2 bar (since CL2 clocks the COUNT-UP and COUNT-DOWN signals) and will be reset by the next CL1 bar which is received by the 2-input NAND gate 188. The set state of this flip-flop produces a high at the output of NAND gate 184. The high output from gate 184 is received by NOR gate 186 thereby setting the flip-flop comprised of NOR gates 186 and 190, and generating the AUTOMATIC DIGITIZE REQUEST bar signal on the output of gate 186. The AUTOMATIC DIGITIZE REQUEST signal is recognized the next time the PC 12 scans the outputs of octal inverting buffer 176 with a READ 301 command. As described previously, recognition of the AUTOMATIC DIGITIZE REQUEST signal by the PC 12 triggers a series of 16 READ 302 commands for reading the X and Y ASCII coordinates of a data point.

NOR gate 192 receives the high output from NOR gate 190 which prevents NAND gate flip-flop 184/188 from being set again until the flip-flop comprised of NOR gates 186 and 190 have been reset. The RESET DATA FLAGS bar signal is inverted by inverter 194 and is received by NOR gate 190 as a high thereby resetting NOR gate flip-flop 186/190. This circuit prevents the possibility of an unpredictable data state at NOR gates flip-flop 186 and 190 by inhibiting further attempts to set it until it has been cleared by the RESET DATA FLAGS signal, and will not allow flip-flop 186/190 to latch an AUTOMATIC DIGITIZE REQUEST bar signal in the case that a TEMPORARY signal occurs simultaneously with RESET DATA FLAGS. If RESET DATA FLAGS occurs simultaneously with TEMPORARY, it must do so when CL2 is low. This circuit lengthens the AUTOMATIC DIGITIZE REQUEST signal past the CL2 bar pulse to guarantee that flip-flop 186/190 is set. If the digitizer is in MANUAL mode, the AUTO DIGITIZE REQUEST is disabled by writing to I/O port H303 with a logic 0 on bit D0, i.e., the false condition of ENABLE AUTOMATIC.

Figure 10:
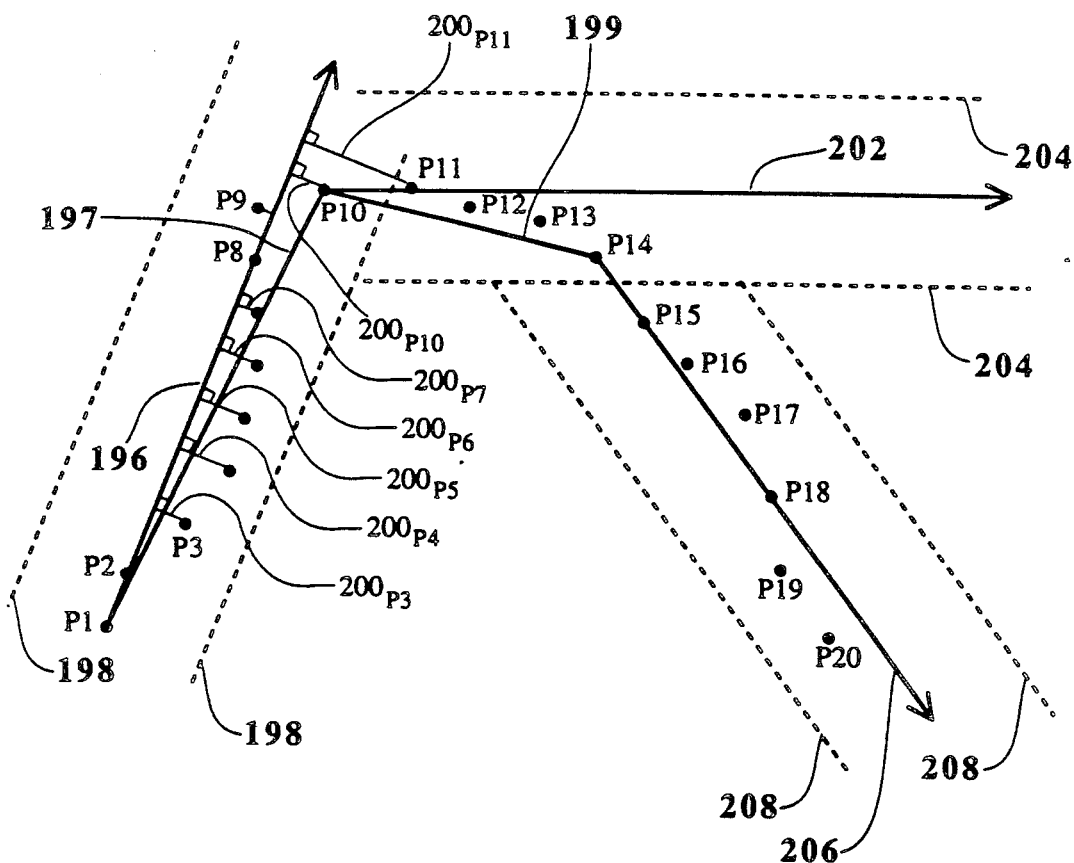
FIG. 10 is a graphical representation of the method for optimizing two-dimensional data points.

FIG. 10 illustrates the data optimizing method of the present invention wherein automatically digitized points are recorded and unnecessary data points discarded without requiring two separate storage files. FIG. 10 illustrates, as an example, the first 20 data points P1 through P20 recorded in the PC 12 memory. The recorded data points P1 through P20 correspond to coordinate data of the stylus 18 as it moves around a two dimensional template 20. After the original digitized points are recorded in the memory of the PC 12, the optimizing method discards unnecessary data points from the original data file according to the following steps:

1) A first direction vector 196 is established through the first two recorded points P1 and P2. P1 is the first point in the data file and is always kept.
2) A first tolerance band 198 using a predetermined offset is established parallel to the direction vector 196. (By way of example, a perpendicular distance of 0.005" on either side of the direction vector may be used to establish the tolerance band. In this example, the tolerance band is considered to be 0.005" wide, as opposed to 0.010" wide, since we are only interested in the perpendicular distance from a point to line.)
3) The perpendicular distance $200_{P3}$ between the next succeeding point, i.e., P3, and the direction vector 196 is calculated. (Note: P2 falls within the tolerance band by definition and, therefore, is discarded.)
4) If the perpendicular distance $200_{P3}$ is within the tolerance band 198, the data point is discarded. Thus, data point P3 will be discarded.
5) Then, the perpendicular distance $200_{P4}$ between the next point P4 and the direction vector 196 is calculated. Since P4 falls within the tolerance band 198, P4 will be discarded, as will each successive point up to P10.
6) However, if a point Px falls outside the tolerance band 198, the immediately preceding data point P(x−1) which is within the tolerance band is kept and a new direction vector is established through that data point P(x−1) and the data point outside the tolerance band Px. Thus, since P11 falls outside the tolerance band 198, P10 is kept and a second direction vector 202 is established through P10 and P11. Note that the optimized path of the first leg is represented by line 197 from point P1 to point P10.
7) A second tolerance band 204 is established parallel to the new direction vector, 202.
8) This process is repeated for every data point in the data file. Subsequent direction vectors and tolerance bands are created and each point is tested to determine whether it falls within the tolerance band. Note, however, that the last point in the data file is always saved and becomes the endpoint of the last optimized path.

Thus, to continue with the example of FIG. 10, perpendicular distances between the new direction vector 202 and data points P12, P13, P14, and P15 are computed, and data points falling inside the new tolerance band 204 are discarded. (Again, by definition, P11 falls within the tolerance band, and is discarded.) In the illustrated example, data point P15 is the first point to fall outside the tolerance band, therefore, the immediately preceding point, P14, is retained. Data points P11, P12, and P13 are discarded. Another direction vector 206 is defined by P14 (the point immediately preceding the first point to fall outside the tolerance band) and point P15, and tolerance band 208 is established. Thus, the next leg of the optimized path is represented by line 199 from P10 to P14. The process is repeated for every data point in the data file. If point P20 were the last point in the data file, the final leg of the optimized path would be represented by a line from P14 to P20. As each data point is retained or discarded, the original file is updated to produce an optimized file containing only necessary data points. An actual program listing for performing the optimizing routine is included in Appendix 2. The procedure OFFSET performs the data compression.

At the end of the process, the resulting data file is likely to be much smaller than the original data file. The number of discarded points depends on the width of the tolerance band and the number of substantially straight edges on the template being digitized. If a three dimensional object is digitized, the tolerance band 198 would be a right circular cylinder with the direction vector 196 establishing the major axis of the cylinder. The predetermined offset or tolerance band can be reduced or enlarged depending upon the required tracing accuracy. By narrowing the tolerance band 198, more data points are kept and more direction vectors are established.

Figure 11:
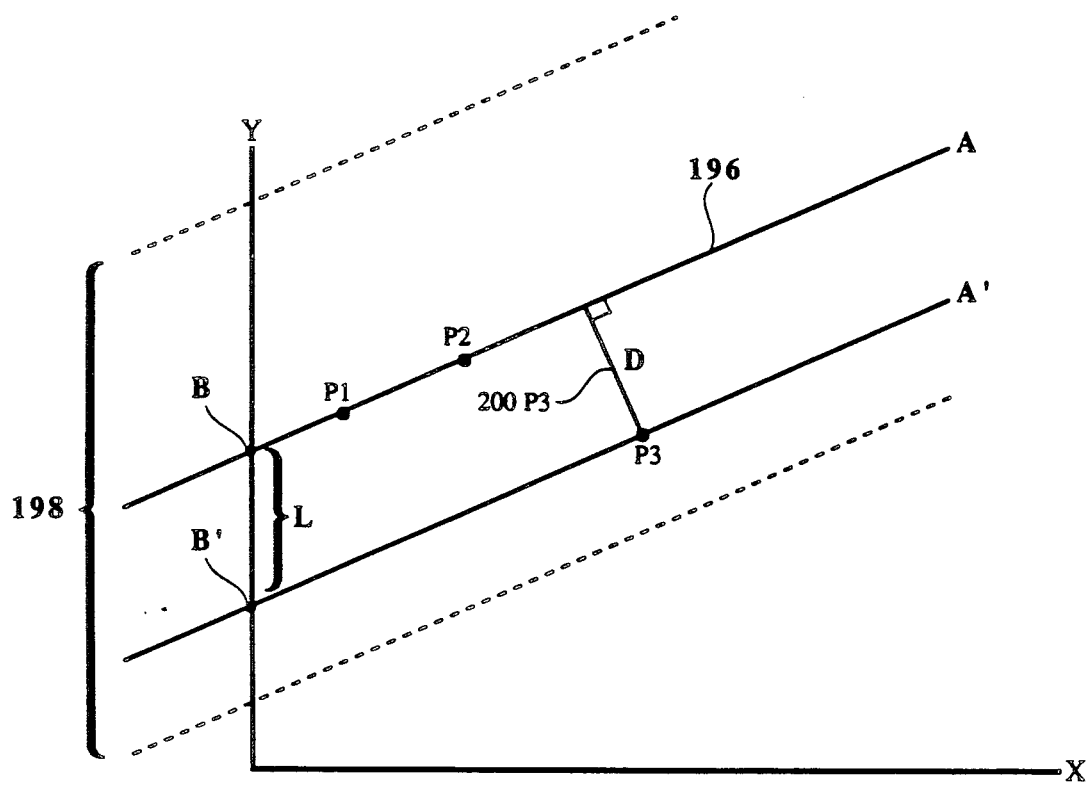
FIG. 11 is a graphical representation of a calculation of the perpendicular distance from a point to a line in two dimensions.

FIG. 11 is a graphical representation of the calculation of the perpendicular distance from a point to a line in two dimensions. The direction vector 196 is represented in FIG. 11 as line A. The slope of line A is M. Line A' passes through point P3 and is parallel to line A. The perpendicular distance $200_{P3}$ between P3 and line A is represented by D. The points B and B' are the Y intercepts of the lines A and A' respectively. The distance L is the distance between B and B'. Thus, the perpendicular distance D between a direction vector and a data point can be computed as follows:

Perpendicular Distance $= |L \cos(\tan^{-1} M)|$ or

Perpendicular Distance $= |L/((1+M^2)^{\frac{1}{2}})|$

If three-dimensional digitizing is used, then the points P1, P2, and P3 may be represented by $P1_{X,Y,Z}$, $P2_{X,Y,Z}$, and $P3_{X,Y,Z}$. Let the direction vector in three space be represented by the line A defined by the points $P1_{X,Y,Z}$ and $P2_{X,Y,Z}$. Then the distance C between the first two digitized points is given by:

$$C = [(P2_X - P1_X)^2 + (P2_Y - P1_Y)^2 + (P2_Z - P1_Z)^2]^{\frac{1}{2}}$$

Before calculating the distance between the point $P3_{X,Y,Z}$ and line A, the direction cosines of line A must be calculated. Let I, J, and K be the angles line A makes with the positive X, Y, and Z axes respectively. Then the direction cosines of A are:

$\cos I = (P2_X - P1_X)/C$ $\cos J = (P2_Y - P1_Y)/C$ $\cos K = (P2_Z - P1_Z)/C$ Now the perpendicular distance D between line A and point $P3_{X,Y,Z}$ can be calculated as follows:

$$D = [((P3_X - P1_X)^2 + (P3_Y - P1_Y)^2 + (P3_Z - P1_Z)^2) - ((\cos I)(P3_X - P1_X) + (\cos J)(P3_Y - P1_Y) + (\cos K)(P3_Z - P1_Z))^2]^{\frac{1}{2}}$$

As in the two-dimensional example, this process is repeated for each successive data point in the data file.

The software for the digitizer system 10 is a menu-driven program with self-explanatory headings. It is designed so that an operator with a minimum of training can follow the menu directions and operate the digitizer. The main menu allows the user to digitize a part, save the most recently digitized part to disk, list part numbers stored on disk, and run a numerically controlled router. Various software modules used in connection with the preferred embodiment of the present invention are included in the appendixes attached hereto.

APPENDIX I

TABLE OF CONTENTS

APPENDIX

1. Table of Contents

2. SMDGT.PAS - Pascal based program for digitizer; contains code for optimizing digitized coordinate input.

3. ABCODE.PAS - Pascal based program for digitizer; contains code for post processing coordinate data and memory management for computer.

4. ABCODE.INT - Pascal based interface program, used to link SMDGT and ABCODE into one program.

5. OUTPORT.ASM - Assembly based program, sends commands to the digitizer interface card. Linked with SMDGT.

6. GTDATA.ASM - Assembly based program, reads digitized XY coordinate data from digitizer interface card. Linked with SMDGT.

7. LOCATE.ASM - Assembly based program. Screen driver for SMDGT.

8. INSTAT.ASM - Assembly based program. Reads status of digitizer interface card.

9. DISTANCE.PAS - Pascal based program. Tests 3D optimizing routine.

APPENDIX 2

SMDGT.PAS

Copyright © 1989, LTV Aerospace and Defense Co.

```
{$FLOATCALLS-}
{$INCLUDE : 'STRINGZZ.INT'}
{$INCLUDE : 'ABCODE.INT'}

PROGRAM SHEET_METAL_DIGITIZER (INPUT, OUTPUT);

USES STRINGZZ, ABCODE;

TYPE GEOMETRY = REAL4;
     IOPORT   = WORD;
     IODATA   = BYTE;
     LOGIC    = BOOLEAN;
     INT      = INTEGER;

VAR  LATCH_REGISTER   : IOPORT;
     STATUS_FLAGS     : IOPORT;
     DATA_REGISTER    : IOPORT;
     AUTOMATIC_ENABLE : IOPORT;
     MODE             : IODATA;
     FINISHED, INFO   : LOGIC;
     SNAP             : LOGIC;
     AL               : INT;
     RAPID_FEED       : PARM;
     ROUTE_FEED       : PARM;
     Z_UP, Z_DWN      : PARM;
     PROG_NAME        : PARM;
     OPER_NAME        : PARM;
     DATE, MSG        : PARM;
     DISK_NAME        : PARM;
     SLOPE, YINT      : GEOMETRY;
```

(*************-EXTERNAL PROCEDURES AND FUNCTIONS-***********************)

PROCEDURE OUTPORT (PORTNUM : WORD; VAL : BYTE); EXTERN;     {PROCEDURE OUTPORT
                                                             WILL OUTPUT A
                                                             VALUE TO A
                                                             SPECIFIED PORT
                                                             -ASSEMBLY
                                                             LANGUAGE}

PROCEDURE GTDATA (VAR XYCOORD : LSTRING); EXTERN;           {PROCEDURE GTDATA WILL
                                                             SET THE LOAD REGISTERS
                                                             AND READ THE XY
                                                             COORDINATE DATA TO A
                                                             STRING VARIABLE
                                                             -ASSEMBLY LANGUAGE}

PROCEDURE LOCATE (ROW, COLUMN : BYTE); EXTERN;              {PROCEDURE LOCATE WILL SET THE
                                                             CURSOR POSITION ON THE VIDEO
                                                             SCREEN -ASSEMBLY LANGUAGE}

FUNCTION INSTAT (PORTNUM : WORD):BYTE; EXTERN;              {FUNCTION INSTAT WILL READ A
                                                             VALID VALUE FROM A SPECIFIED
                                                             PORT AND RESET THE STATUS
                                                             FLAGS -ASSEMBLY LANGUAGE}

FUNCTION DOSXQQ(COMMAND, PARAMETER : WORD):BYTE; EXTERN;    {FUNCTION DOSXQQ
                                                             INVOKES OPERATING
                                                             SYSTEM FOR
                                                             KEYBOARD INPUT -MS
                                                             PASCAL LIBRARY}

(********************************************************************************)

PROCEDURE AUTO_MODE(VAR XY_ARRAY : XYDATA; VAR AL : INTEGER; LATCH_REGISTER,
STATUS_FLAGS, AUTOMATIC_ENABLE : WORD);
VAR VAL, VALS : BYTE;
    XYCOORD   : LSTRING(16);
    FINISHED, FLIP_FLOP : BOOLEAN;

BEGIN
 XYCOORD := 'INITIALIZE       '; {INITIALIZE STRING VARIABLE}
 FINISHED := FALSE;
 FLIP_FLOP := FALSE;
 OUTPORT(LATCH_REGISTER,8);       {RESET DATA FLAGS}
 OUTPORT(AUTOMATIC_ENABLE,1);     {SET AUTOMATIC ENABLE}
 XY_ARRAY^[AL] := 'AUTO ON';      {SET AUTO ON FLAG}
 AL := AL + 1;
 REPEAT
  VAL := INSTAT(STATUS_FLAGS);    {READ THE STATUS FLAGS}
  VALS := (VAL AND 1);            {TEST IF BIT 0 IS TRUE}
  IF VALS = 1
   THEN BEGIN
         IF FLIP_FLOP = FALSE            {RECORD EVERY OTHER XY COORDINATE}
           THEN FLIP_FLOP := TRUE        {TO SAVE ARRAY SPACE}
         ELSE FLIP_FLOP := FALSE;
         IF FLIP_FLOP = TRUE
           THEN BEGIN
                GTDATA(XYCOORD);         {GET DIGITIZED XY COORDINATES}
                WRITELN(XYCOORD);
                XY_ARRAY^[AL] := XYCOORD;
                AL := AL + 1;
                END;

```
            END;
   VALS := (VAL AND 4);            {TEST IF BIT 2 IS TRUE}
   IF VALS = 4
     THEN BEGIN
            OUTPORT(LATCH_REGISTER,1);    {RESET COUNTERS}
            OUTPORT(LATCH_REGISTER,0);    {LATCH COUNTERS}
          END;
   VALS := (VAL AND 16);
   IF VALS = 16
     THEN BEGIN
            XY_ARRAY^[AL] := 'AUTO OFF';
            AL := AL + 1;
            WRITELN('Z IS DOWN');
            XY_ARRAY^[AL] := 'Z IS DOWN';
            AL := AL + 1;
            XY_ARRAY^[AL] := 'AUTO ON';
            AL := AL + 1;
          END;
   VALS := (VAL AND 32);
   IF VALS = 32
     THEN BEGIN
            XY_ARRAY^[AL] := 'AUTO OFF';
            AL := AL + 1;
            WRITELN('Z IS UP');
            XY_ARRAY^[AL] := 'Z IS UP';
            AL := AL + 1;
            XY_ARRAY^[AL] := 'AUTO ON';
            AL := AL + 1;
          END;
   VALS := (VAL AND 8);             {TEST IF BIT 3 IS TRUE}
   IF VALS = 8
     THEN FINISHED := TRUE;         {END AUTOMATIC SEQUENCE}
 UNTIL FINISHED;
 XY_ARRAY^[AL] := 'AUTO OFF';       {SET AUTO OFF FLAG}
 AL := AL + 1;
 OUTPORT(AUTOMATIC_ENABLE,0);       {END AUTOMATIC ENABLE};
END; {PROCEDURE AUTO_MODE}

(*******************************************************************)

PROCEDURE MANUAL_MODE(VAR XY_ARRAY : XYDATA; VAR AL : INTEGER; LATCH_REGISTER,
STATUS_FLAGS : WORD);
VAR VAL, VALS : BYTE;
    XYCOORD   : LSTRING(16);
    FINISHED  : BOOLEAN;

BEGIN
 XYCOORD := 'INITIALIZE       ';  {INITIALIZE STRING VARIABLE}
 FINISHED := FALSE;
 OUTPORT(LATCH_REGISTER,8);        {RESET DATA FLAGS}
 REPEAT
  VAL := INSTAT(STATUS_FLAGS);     {READ THE STATUS FLAGS}
  VALS := (VAL AND 2);             {TEST IF BIT 1 IS TRUE}
  IF VALS = 2
    THEN BEGIN
           GTDATA(XYCOORD);        {GET DIGITIZED XY COORDINATES}
           WRITELN(XYCOORD);
           XY_ARRAY^[AL] := XYCOORD;
           AL := AL + 1;
         END;
  VALS := (VAL AND 4);             {TEST IF BIT 2 IS TRUE}
```

```
        IF VALS = 4
          THEN BEGIN
                OUTPORT(LATCH_REGISTER,1);      {RESET COUNTERS}
                OUTPORT(LATCH_REGISTER,0);      {LATCH COUNTERS}
              END;
        VALS := (VAL AND 16);           {TEST IF BIT 4 IS TRUE}
        IF VALS = 16
          THEN BEGIN
                WRITELN('Z IS DOWN');
                XY_ARRAY^[AL] := 'Z IS DOWN';
                AL := AL + 1;
              END;
        VALS := (VAL AND 32);           {TEST IF BIT 5 IS TRUE}
        IF VALS = 32
          THEN BEGIN
                WRITELN('Z IS UP');
                XY_ARRAY^[AL] := 'Z IS UP';
                AL := AL + 1;
              END;
        VALS := (VAL AND 8);            {TEST IF BIT 3 IS TRUE}
        IF VALS = 8
          THEN FINISHED := TRUE;        {END MANUAL SEQUENCE}
      UNTIL FINISHED;
END; {PROCEDURE MANUAL MODE}

(*********************************************************************)

PROCEDURE SETUP(VAR MODE : BYTE);
VAR ROW, COLUMN : BYTE;
    GOOD_INPUT  : BOOLEAN;

BEGIN
 GOOD_INPUT := FALSE;
 ROW := 7;
 COLUMN := 0;
 LOCATE(ROW,COLUMN);
 WRITELN('This program will input and post process XY coordinate data from');
 WRITELN('the sheet metal digitizer.  Enter the number which corresponds');
 WRITELN('to the option you wish to use.');
 WRITELN;
 WRITELN;
 WRITELN('  1.)    Begin N/C program.');
 WRITELN;
 WRITELN('  2.)    Drill sequence.');
 WRITELN;
 WRITELN('  3.)    Route sequence.');
 WRITELN;
 WRITELN('  4.)    Post process.');
 WRITELN;
 WRITELN('  5.)    Quit digitizer.');
 WRITELN;
 REPEAT
   MODE := DOSXQQ(1,0);         {GET THE ASCII VALUE OF THE CHARACTER TYPED}
   IF (MODE >= 49) AND (MODE <= 53) {ASCII CODES FOR NUMBERS 1 THROUGH 5}
     THEN GOOD_INPUT := TRUE;
 UNTIL GOOD_INPUT;
 WRITELN;
END; {PROCEDURE SETUP}

(*********************************************************************)
```

```
PROCEDURE HEADER(VAR PROG_NAME, OPER_NAME, DATE, MSG, DISK_NAME : LSTRING);
VAR ROW, COLUMN : BYTE;
            TIME : LSTRING(8);

BEGIN
 ROW := 7;
 COLUMN := 0;
 LOCATE(ROW,COLUMN);
 WRITELN('The following information will go on the beginning of the N/C
program.');
 WRITELN;
 DATEZZ(DATE);
 TIMEZZ(TIME);
 CONCAT(DATE,' ');
 CONCAT(DATE,TIME);
 CVTZZ(DATE,DATE,32);              {CONVERT LOWER CASE TO UPPER CASE}
 WRITELN('Todays date and time is ',DATE);
 WRITELN;
 WRITELN('Enter program name.');
 READLN(PROG_NAME);
 WRITELN;
 WRITELN('Enter your name.');
 READLN(OPER_NAME);
 WRITELN;
 WRITELN('Enter tool serial and suffix numbers.');
 READLN(MSG);
 WRITELN;
 WRITELN('Enter name to save program to disk.');
 READLN(DISK_NAME);
 CONCAT(DISK_NAME,'.TXT');
END; {PROCEDURE HEADER}

(****************************************************************)

PROCEDURE PARAMETER(VAR RAPID_FEED, ROUTE_FEED, Z_UP, Z_DWN : PARM);
VAR ROW, COLUMN, ANS : BYTE;
            CHANGE : BOOLEAN;
BEGIN
 CHANGE := FALSE;
ROW := 7;
COLUMN := 0;
LOCATE(ROW,COLUMN);
WRITE('Do you wish to change any of the machining parameters? (Y/N)  ');
ANS := DOSXQQ(1,0);           {GET THE ASCII VALUE OF THE CHARACTER TYPED}
IF (ANS = 89) OR (ANS = 121)    {ASCII CODES FOR UPPER AND LOWER CASE Y}
 THEN CHANGE := TRUE;
WHILE CHANGE DO
 BEGIN
  WRITELN;
  WRITE('Enter new rapid feed rate <F0>. ');
  READLN(RAPID_FEED);
   IF RAPID_FEED.LEN = 0          {CARRIAGE RETURN}
    THEN RAPID_FEED := 'F0';
  WRITELN;
  WRITE('Enter new routing feed rate <F35000>. ');
  READLN(ROUTE_FEED);
   IF ROUTE_FEED.LEN = 0          {CARRIAGE RETURN}
    THEN ROUTE_FEED := 'F35000';
  WRITELN;
  WRITE('Enter new Z retract distance <Z0>. ');
  READLN(Z_UP);
```

```
    IF Z_UP.LEN = 0                        {CARRIAGE RETURN}
      THEN Z_UP := 'Z0';
    WRITELN;
    WRITE('Enter new Z plunge distance <Z-10620>. ');
    READLN(Z_DWN);
    IF Z_DWN.LEN = 0                       {CARRIAGE RETURN}
      THEN Z_DWN := 'Z-10620';
    CHANGE := FALSE;
  END; {WHILE LOOP}
END; {PROCEDURE PARAMETER}

(***********************************************************************)

PROCEDURE DRILL_SEQUENCE(VAR XY_ARRAY : XYDATA; VAR AL : INTEGER;
LATCH_REGISTER, STATUS_FLAGS : WORD);
VAR ROW, COLUMN, DRILL, SPINDLE : BYTE;
                  GOOD_INPUT : BOOLEAN;

BEGIN
 GOOD_INPUT := FALSE;
 ROW := 0;
 COLUMN := 0;
 XY_ARRAY^[AL] := 'DRILL ON';              {SET DRILL ON FLAG}
 AL := AL + 1;
 LOCATE(ROW,COLUMN);
 WRITELN('Enter number to select drill size.');
 WRITELN;
 WRITELN('    1.)    Size 40.');
 WRITELN;
 WRITELN('    2.)    Size 30.');
 WRITELN;
 WRITELN('    3.)    Size 20.');
 WRITELN;
 WRITELN('    4.)    7/16" dia.');
 WRITELN;
 WRITELN('    5.)    1/4" dia.');
 WRITELN;
 WRITELN('    6.)    Size F.');
 WRITELN;
 REPEAT
   DRILL := DOSXQQ(1,0);                   {GET THE ASCII VALUE OF THE CHARACTER
TYPED}
   IF (DRILL >= 49) AND (DRILL <= 54)      {ASCII CODES FOR NUMBERS 1 THROUGH 6}
     THEN GOOD_INPUT := TRUE;
 UNTIL GOOD_INPUT;
 GOOD_INPUT := FALSE;
 WRITELN;
 WRITELN('Enter number for spindle to be used for drilling.');
 WRITELN;
 WRITELN('    1.)    Right spindle.');
 WRITELN;
 WRITELN('    2.)    Left spindle.');
 WRITELN;
 REPEAT
   SPINDLE := DOSXQQ(1,0);                 {GET THE ASCII VALUE OF THE CHARACTER TYPED}
   IF (SPINDLE >= 49) AND (SPINDLE <= 50){ASCII CODES FOR NUMBERS 1 THROUGH 2}
     THEN GOOD_INPUT := TRUE;
 UNTIL GOOD_INPUT;
 WRITELN;
 CASE DRILL OF
```

```
     49 : XY_ARRAY^[AL] := 'SIZE A';        {SET FLAG FOR SIZE 40 DRILL}
     50 : XY_ARRAY^[AL] := 'SIZE B';        {SET FLAG FOR SIZE 30 DRILL}
     51 : XY_ARRAY^[AL] := 'SIZE C';        {SET FLAG FOR SIZE 20 DRILL}
     52 : XY_ARRAY^[AL] := 'SIZE D';        {SET FLAG FOR 7/16 DIA DRILL}
     53 : XY_ARRAY^[AL] := 'SIZE E';        {SET FLAG FOR 1/4 DIA DRILL}
     54 : XY_ARRAY^[AL] := 'SIZE F';        {SET FLAG FOR SIZE F DRILL}
   END; {CASE}
   AL := AL + 1;
   IF SPINDLE = 49
     THEN XY_ARRAY^[AL] := 'RIGHT'          {SET FLAG FOR RIGHT SPINDLE}
     ELSE XY_ARRAY^[AL] := 'LEFT';          {SET FLAG FOR LEFT SPINDLE}
   AL := AL + 1;
   MANUAL_MODE(XY_ARRAY,AL,LATCH_REGISTER,STATUS_FLAGS);
   XY_ARRAY^[AL] := 'DRILL OFF';            {SET DRILL OFF FLAG}
   AL := AL + 1;
 END; {PROCEDURE DRILL_SEQUENCE}

(*****************************************************************)

PROCEDURE ROUTE_SEQUENCE(VAR XY_ARRAY : XYDATA; VAR AL : INTEGER;
LATCH_REGISTER, STATUS_FLAGS, AUTOMATIC_ENABLE : WORD);
VAR ROW, COLUMN, MODE : BYTE;
         GOOD_INPUT : BOOLEAN;

BEGIN
 GOOD_INPUT := FALSE;
 ROW := 7;
 COLUMN := 0;
 XY_ARRAY^[AL] := 'ROUTE ON';               {SET ROUTE ON FLAG}
 AL := AL + 1;
 LOCATE(ROW,COLUMN);
 WRITELN('Enter number to select digitizing mode.');
 WRITELN;
 WRITELN('    1.)    Manual mode.');
 WRITELN;
 WRITELN('    2.)    Automatic mode.');
 WRITELN;
 REPEAT
   MODE := DOSXQQ(1,0);           {GET THE ASCII VALUE OF THE CHARACTER TYPED}
   IF (MODE >= 49) AND (MODE <= 50)    {ASCII CODES FOR NUMBERS 1 THROUGH 2}
     THEN GOOD_INPUT := TRUE;
 UNTIL GOOD_INPUT;
 WRITELN;
 IF MODE = 49
   THEN MANUAL_MODE(XY_ARRAY,AL,LATCH_REGISTER,STATUS_FLAGS)
   ELSE AUTO_MODE(XY_ARRAY,AL,LATCH_REGISTER,STATUS_FLAGS,AUTOMATIC_ENABLE);
 XY_ARRAY^[AL] := 'ROUTE OFF';              {SET ROUTE OFF FLAG}
 AL := AL + 1;
END; {PROCEDURE ROUTE_SEQUENCE}

(*****************************************************************)

PROCEDURE STRING_TO_INTEGER(VAR XY_ARRAY : XYDATA; VAR INT_ARRAY : INDATA;
START, FINISH : INTEGER; VAR X : INTEGER);
VAR I, J, S, F, Y, CNT, STAT, VAL : INTEGER;
                 INSTR, STR : LSTRING(18);
                      POWER : INTEGER4;

BEGIN
 X := 1;
 Y := 1;
```

```
      FOR I := START TO FINISH DO
        BEGIN
          INSTR := XY_ARRAY^[I];
          LEFTZZ(STR,INSTR,1);               {GET LEFT MOST CHARACTER FROM STRING}
          IF STR = 'X'                       {TEST FOR XY COORDINATES}
            THEN BEGIN
                   INT_ARRAY^[X,1] := 0;     {INITIALIZE ARRAY VALUES TO ZERO}
                   INT_ARRAY^[X,2] := 0;
                   S := 8;     {POINTER FOR ENDING LOCATION OF X COORDINATE IN STRING}
                   F := 3;     {POINTER FOR STARTING LOCATION OF X COORDINATE IN
                                STRING}
                   POWER := 1;
                   FOR J := 1 TO 2 DO
                   BEGIN
                     FOR CNT := S DOWNTO F DO
                       BEGIN
                         SUBSTRZZ(STR,INSTR,CNT,1);   {EXTRACT A SUBSTRING}
                         VAL := IVALZZ(STR,STAT); {GET INTEGER VALUE OF A NUMERIC STRING}
                         CASE VAL OF
                           0 : INT_ARRAY^[X,Y] := INT_ARRAY^[X,Y] + 0;
                           1 : INT_ARRAY^[X,Y] := INT_ARRAY^[X,Y] + (1 * POWER);
                           2 : INT_ARRAY^[X,Y] := INT_ARRAY^[X,Y] + (2 * POWER);
                           3 : INT_ARRAY^[X,Y] := INT_ARRAY^[X,Y] + (3 * POWER);
                           4 : INT_ARRAY^[X,Y] := INT_ARRAY^[X,Y] + (4 * POWER);
                           5 : INT_ARRAY^[X,Y] := INT_ARRAY^[X,Y] + (5 * POWER);
                           6 : INT_ARRAY^[X,Y] := INT_ARRAY^[X,Y] + (6 * POWER);
                           7 : INT_ARRAY^[X,Y] := INT_ARRAY^[X,Y] + (7 * POWER);
                           8 : INT_ARRAY^[X,Y] := INT_ARRAY^[X,Y] + (8 * POWER);
                           9 : INT_ARRAY^[X,Y] := INT_ARRAY^[X,Y] + (9 * POWER);
                         END;   {CASE}
                         POWER := POWER * 10;
                       END;   {CNT FOR LOOP}
                     S := 16;           {POINTER FOR ENDING LOCATION OF Y COORDINATE IN
                                         STRING}
                     F := 11;           {POINTER FOR STARTING LOCATION OF Y COORDINATE
                                         IN STRING}
                     Y := 2;
                     POWER := 1;
                   END;   {J FOR LOOP}
                   SUBSTRZZ(STR,INSTR,2,1);
                   IF STR = '-'         {TEST FOR NEGATIVE NUMBERS}
                     THEN INT_ARRAY^[X,1] := INT_ARRAY^[X,1] * (-1);
                   SUBSTRZZ(STR,INSTR,10,1);
                   IF STR = '-'
                     THEN INT_ARRAY^[X,2] := INT_ARRAY^[X,2] * (-1);
                   X := X + 1;
                   Y := 1;
                 END;   {IF STATEMENT}
        END;   {I FOR LOOP}
      X := X - 1;     {LENGTH OF INT_ARRAY}
    END;   {PROCEDURE STRING_TO_INTEGER}

(******************************************************************************)

PROCEDURE OFFSET(VAR XY_ARRAY, OPT_ARRAY : XYDATA; VAR INT_ARRAY : INDATA;
START, FINISH, X : INTEGER; VAR CNT : INTEGER);

VAR DELTAX, DELTAY, B, M, D : REAL;
    I, J, K : INTEGER;
```

```
BEGIN
OPT_ARRAY^[CNT] := XY_ARRAY^[START];  {FIRST XY COORDINATE ALWAYS USED}
CNT := CNT + 1;
J := 1;
DELTAX := INT_ARRAY^[J+1,1] - INT_ARRAY^[J,1];
DELTAY := INT_ARRAY^[J+1,2] - INT_ARRAY^[J,2];
FOR I := 3 TO X DO
  BEGIN
    IF DELTAX = 0     {TEST FOR VERTICAL LINE, PROTECT AGAINST DIVIDE BY ZERO}
      THEN D := ABS(INT_ARRAY^[I,1] - INT_ARRAY^[J,1])  {DISTANCE BETWEEN POINT
                                                          AND LINE}
      ELSE IF DELTAY = 0                         {TEST FOR HORIZONTAL LINE}
        THEN D := ABS(INT_ARRAY^[I,2] - INT_ARRAY^[J,2])  {DISTANCE BETWEEN POINT
                                                            AND LINE}
        ELSE BEGIN           {LINE NOT VERTICAL OR HORIZONTAL}
            M := DELTAY/DELTAX;           {SLOPE}
            B := (INT_ARRAY^[I,2] - M*INT_ARRAY^[I,1]) - (INT_ARRAY^[J,2] -
              M*INT_ARRAY^[J,1]); {VERTICAL DISTANCE BETWEEN Y INTERCEPTS}
            D := ABS(B*COS(ARCTAN(M)));  {DISTANCE BETWEEN POINT AND LINE}
          END;
    IF D >= 12.7     {POINT FALLS OUTSIDE TOLERANCE. DIGITIZER ENCODERS READS
                      METRIC}
      THEN BEGIN      {2540 counts = 1", 12.7 counts = .005", D = 127000}
          K := START + I - 2;  {EQUATE POINTER FOR INT_ARRAY TO POINTER FOR
                                 XY_ARRRAY}
          OPT_ARRAY^[CNT] := XY_ARRAY^[K];
          CNT := CNT + 1;
          J := I - 1;
          DELTAX := INT_ARRAY^[J,1] - INT_ARRAY^[I,1];
          DELTAY := INT_ARRAY^[J,2] - INT_ARRAY^[I,2];
        END;
  END;  {FOR LOOP}
OPT_ARRAY^[CNT] := XY_ARRAY^[FINISH];  {LAST XY COORDINATE ALWAYS USED}
CNT := CNT + 1;
END;  {PROCEDURE OFFSET}

(*******************************************************************)

PROCEDURE OPTIMIZER(VAR XY_ARRAY, OPT_ARRAY : XYDATA; VAR INT_ARRAY : INDATA;
VAR AL : INTEGER);
VAR I, X, CNT, START, FINISH : INTEGER;
    TRANSFER, END_ARRAY    : BOOLEAN;

BEGIN
I := 1;
CNT := 1;
TRANSFER := TRUE;
END_ARRAY := FALSE;
REPEAT
  IF (XY_ARRAY^[I] <> 'AUTO ON') AND (TRANSFER = TRUE)
    THEN BEGIN
          OPT_ARRAY^[CNT] := XY_ARRAY^[I];
          CNT := CNT + 1;
          I := I + 1;
        END
    ELSE IF XY_ARRAY^[I] = 'AUTO ON'
      THEN BEGIN
          TRANSFER := FALSE;
          I := I + 1;
          START := I;
        END
```

```
      ELSE IF XY_ARRAY^[I] = 'AUTO OFF'
        THEN BEGIN
              FINISH := I - 1;
              IF (FINISH <> START - 1)
                THEN BEGIN
                      STRING_TO_INTEGER(XY_ARRAY,INT_ARRAY,START,FINISH,X);
                      OFFSET(XY_ARRAY,OPT_ARRAY,INT_ARRAY,START,FINISH,X,CNT);
                    END;
              TRANSFER := TRUE;
              I := I + 1;
            END
      ELSE I := I + 1;
      IF I = AL
        THEN END_ARRAY := TRUE;
    UNTIL END_ARRAY;
    AL := CNT;
END;   {PROCEDURE OPTIMIZER}

(************************************************************)

FUNCTION POWER(BASE, EXP : INTEGER) : INTEGER4 [PURE];
VAR I,    : INTEGER;
    RAISE : INTEGER4;

BEGIN
 IF EXP = 0
   THEN POWER := 1
 ELSE IF EXP = 1
   THEN POWER := BASE
 ELSE BEGIN
        RAISE := BASE;
        FOR I := 1 TO EXP - 1 DO
          BEGIN
           RAISE := RAISE * BASE;
          END;   {I FOR LOOP}
          POWER := RAISE;
        END;   {ELSE}
END;   {FUNCTION POWER}

(************************************************************)

PROCEDURE INTEGER_TO_STRING(VAR INT_ARRAY : INDATA; VAR NSTR : LSTRING; X :
INTEGER);
VAR PTR, I, J, L : INTEGER;
    PWR, TEMP, INT : INTEGER4;
            OUTSTR : LSTRING(18);
              NUM : REAL4;
BEGIN
 PTR := 2;
 FILLZZ(NSTR,'X',1,1);
 FOR I := 1 TO 2 DO
   BEGIN
    INT := ABS(INT_ARRAY^[X,I]);
    IF INT_ARRAY^[X,I] < 0         {TEST FOR NEGATIVE XY VALUES}
      THEN BEGIN
            FILLZZ(NSTR,'-',PTR,1);
            PTR := PTR + 1;
           END;
    IF INT >= 1000000      {MAGNITUDE OF INT}
      THEN L := 7
    ELSE IF INT >= 100000
```

```
          THEN L := 6
     ELSE IF INT >= 10000
          THEN L := 5
     ELSE IF INT >= 1000
          THEN L := 4
     ELSE IF INT >= 100
          THEN L := 3
     ELSE IF INT >= 10
          THEN L := 2
     ELSE L := 1;
     FOR J := L DOWNTO 1 DO
      BEGIN
       PWR := POWER(10,J-1);
       NUM := INT * (1/PWR);     {SHIFT DECIMAL POINT TO LEFT L - 1 PLACES}
       TEMP := TRUNC4(NUM);      {GET SINGLE DIGIT FROM INTTEGER4 VALUE}
       IF TEMP = 9
         THEN FILLZZ(NSTR,'9',PTR,1)
       ELSE IF TEMP = 8
         THEN FILLZZ(NSTR,'8',PTR,1)
       ELSE IF TEMP = 7
         THEN FILLZZ(NSTR,'7',PTR,1)
       ELSE IF TEMP = 6
         THEN FILLZZ(NSTR,'6',PTR,1)
       ELSE IF TEMP = 5
         THEN FILLZZ(NSTR,'5',PTR,1)
       ELSE IF TEMP = 4
         THEN FILLZZ(NSTR,'4',PTR,1)
       ELSE IF TEMP = 3
         THEN FILLZZ(NSTR,'3',PTR,1)
       ELSE IF TEMP = 2
         THEN FILLZZ(NSTR,'2',PTR,1)
       ELSE IF TEMP = 1
         THEN FILLZZ(NSTR,'1',PTR,1)
       ELSE FILLZZ(NSTR,'0',PTR,1);
       PTR := PTR + 1;
       TEMP := TEMP * PWR;       {SHIFT DECIMAL POINT TO RIGHT L - 1 PLACES}
       INT := INT - TEMP;        {REMOVE MOST SIGNIFICANT DIGIT FROM INT}
      END;  {J FOR LOOP}
     IF I = 1
       THEN BEGIN
             FILLZZ(NSTR,'Y',PTR,1);
             PTR := PTR + 1;
            END;  {IF}
    END;  {I FOR LOOP}
END;  {PROCEDURE INTEGER_TO_STRING}

(*********************************************************************)

PROCEDURE CONVERT(VAR OPT_ARRAY : XYDATA; VAR INT_ARRAY : INDATA; AL :
INTEGER; SNAP : LOGIC; SLOPE, YINT : GEOMETRY);
VAR I, J, X, START, FINISH : INTEGER;
                    C : INTEGER4;
                    DX, DY, DXR, DYR : REAL4;
          INSTR, STR, NSTR : LSTRING(18);

BEGIN
  C := 2540;                    {2540 ENCODER COUNTS = 1"}
  START := 1;
  FINISH := AL - 1;
  STRING_TO_INTEGER(OPT_ARRAY,INT_ARRAY,START,FINISH,X);
  FOR I := 1 TO X DO
```

```
      BEGIN
        DX := INT_ARRAY^[I,1]/C;   {CONVERT ENCODER COUNTS TO INCHES}
        DY := INT_ARRAY^[I,2]/C;   {CONVERT ENCODER COUNTS TO INCHES}
        IF SNAP = TRUE
          THEN BEGIN
                DXR := (DX + (SLOPE * (DY - YINT)))/SQRT(1 + SQR(SLOPE));
                        {ROTATE POINTS}
                DYR := (-1 * (DX * SLOPE) + (DY - YINT))/SQRT(1+SQR(SLOPE));
                DXR := DXR*10000; {SHIFT DECIMAL POINT FOUR PLACES TO RIGHT}
                DYR := DYR*10000; {SHIFT DECIMAL POINT FOUR PLACES TO RIGHT}
                INT_ARRAY^[I,1] := ROUND4(DXR);   {ROUND AND RETURN INTEGER4}
                INT_ARRAY^[I,2] := ROUND4(DYR);   {ROUND AND RETURN INTEGER4}
               END
          ELSE BEGIN
                DX := DX*10000;            {SHIFT DECIMAL POINT FOUR PLACES TO RIGHT}
                DY := DY*10000;            {SHIFT DECIMAL POINT FOUR PLACES TO RIGHT}
                INT_ARRAY^[I,1] := ROUND4(DX);    {ROUND AND RETURN INTEGER4}
                INT_ARRAY^[I,2] := ROUND4(DY);    {ROUND AND RETURN INTEGER4}
               END;
   END;   {I FOR LOOP}
 X := 1;
 FOR I := 1 TO AL - 1 DO
   BEGIN
    INSTR := OPT_ARRAY^[I];
    LEFTZZ(STR,INSTR,1);
    IF STR = 'X'
      THEN BEGIN
            NSTR := ' ';         {CLEAR STRING}
            INTEGER_TO_STRING(INT_ARRAY,NSTR,X);
            OPT_ARRAY^[I] := NSTR;
            X := X + 1;
           END;   {IF STATEMENT}
    END;   {I FOR LOOP}
 END;   {PROCEDURE CONVERT}

(*********************************************************************)

PROCEDURE SNAP_AXIS(VAR XY_ARRAY:XYDATA;VAR INT_ARRAY:INDATA;VAR
AL:INT;LATCH_REGISTER,STATUS_FLAGS:WORD;
                    VAR SNAP:LOGIC;VAR SLOPE, YINT:GEOMETRY);
VAR ANS  : BYTE;     {USED TO ALIGN PART}
    X, I : INTEGER;
    C : INTEGER4;   {PARALLEL TO X AXIS FOR K & T EXTRUSION MILL}
    RL_ARRAY : ARRAY[1..2,1..2] OF REAL4;

BEGIN
 C := 2540;
 LOCATE(7,0);
 WRITE('Do you wish to align part to X axis? (Y/N)  ');
 ANS := DOSXQQ(1,0);
 IF (ANS = 89) OR (ANS = 121)   {ASCII CODES FOR UPPER AND LOWER CASE Y}
   THEN BEGIN
         SNAP := TRUE;
         WRITELN;
         WRITELN('Select zero point and digitize two points on reference
line.');
         MANUAL_MODE(XY_ARRAY,AL,LATCH_REGISTER,STATUS_FLAGS);
         STRING_TO_INTEGER(XY_ARRAY,INT_ARRAY,1,2,X);
         FOR I := 1 TO 2 DO
           BEGIN
```

```
            RL_ARRAY[I,1] := INT_ARRAY^[I,1]/C;    {CONVERT ENCODER COUNTS TO
                                                    INCHES}
            RL_ARRAY[I,2] := INT_ARRAY^[I,2]/C;
          END;
        SLOPE := (RL_ARRAY[2,2] - RL_ARRAY[1,2])/(RL_ARRAY[2,1] -
     RL_ARRAY[1,1]);
        YINT := RL_ARRAY[1,2] - (SLOPE * RL_ARRAY[1,1]);   {Y INTERCEPT}
      END
  ELSE SNAP := FALSE;
END;   {PROCEDURE SNAP_AXIS}

(************-MAIN PROGRAM-*********************************************)

BEGIN
  LATCH_REGISTER   := 768;           {SET THE VALUES FOR THE I/O PORTS}
  STATUS_FLAGS     := 769;
  DATA_REGISTER    := 770;
  AUTOMATIC_ENABLE := 771;

RAPID_FEED       := 'F0';          {SET MACHINE PARAMETER DEFAULTS}
  ROUTE_FEED       := 'F35000';
  Z_UP             := 'Z0';
  Z_DWN            := 'Z-10620';

FINISHED         := FALSE;
  INFO             := FALSE;
  AL               := 1;             {ARRAY LENGTH COUNTER}

OUTPORT(AUTOMATIC_ENABLE,0);    {MAKE SURE AUTOMATIC ENABLE IS OFF}
  OUTPORT(LATCH_REGISTER,1);      {RESET COUNTERS}
  OUTPORT(LATCH_REGISTER,0);      {LATCH COUNTERS}
  MEMORY_MANAGEMENT(XY_ARRAY,OPT_ARRAY,INT_ARRAY);
  REPEAT
    SETUP(MODE);
    IF MODE = 49         {ASCII CODE FOR 1}
      THEN BEGIN
           HEADER(PROG_NAME,OPER_NAME,DATE,MSG,DISK_NAME);
           SNAP_AXIS(XY_ARRAY, INT_ARRAY, AL, LATCH_REGISTER, STATUS_FLAGS,
              SNAP, SLOPE,YINT);
           AL := 1;
           INFO := TRUE;
         END
    ELSE IF MODE = 50   {ASCII CODE FOR 2}
      THEN DRILL_SEQUENCE(XY_ARRAY,AL,LATCH_REGISTER,STATUS_FLAGS)
    ELSE IF MODE = 51   {ASCII CODE FOR 3}
      THEN
ROUTE_SEQUENCE(XY_ARRAY,AL,LATCH_REGISTER,STATUS_FLAGS,AUTOMATIC_ENABLE)
    ELSE IF MODE = 52   {ASCII CODE FOR 4}
      THEN BEGIN
           IF INFO = TRUE
             THEN BEGIN
                  PARAMETER(RAPID_FEED,ROUTE_FEED,Z_UP,Z_DWN);
                  LOCATE(7,0);
                  WRITELN('Optimizer.......');
                  OPTIMIZER(XY_ARRAY,OPT_ARRAY,INT_ARRAY,AL);
                  WRITELN;
                  WRITELN('Convert.........');
                  CONVERT(OPT_ARRAY,INT_ARRAY,AL,SNAP,SLOPE,YINT);
                  WRITELN;
                  WRITELN('Machine Code...');
```

```
                CODE(OPT_ARRAY,RAPID_FEED, ROUTE_FEED, Z_UP, Z_DWN, PROG_NAME,
                    OPER_NAME, DATE,MSG,DISK_NAME,AL);
                RAPID_FEED := 'F0';     {RESET DEFAUTS FOR NEXT N/C PROGRAM}
                ROUTE_FEED := 'F35000';
                Z_UP       := 'Z0';
                Z_DWN      := 'Z-10620';
                AL         := 1;
                INFO       := FALSE;
            END
        ELSE BEGIN
            WRITELN('You need to run the Begin N/C program option
first.');
            WRITELN('To continue, press return.');
            READLN;
            END;
        END
   ELSE FINISHED := TRUE;  {ASCII CODE WAS 5, QUIT DIGITIZER}
   UNTIL FINISHED;
END. {MAIN PROGRAM}
```

APPENDIX 3

ABCODE.PAS

Copyright © 1989, LTV Aerospace and Defense Co.

```
{$FLOATCALLS-}
{$INCLUDE:'ABCODE.INT'}
{$INCLUDE:'SUPUTLDD.INT'}
{$INCLUDE:'MEMORYMM.INT'}
{$INCLUDE:'FFORMSUU.INT'}

IMPLEMENTATION OF ABCODE;

USES MEMORYMM, FFORMSUU;

(*********************************************************************)

PROCEDURE DRILL_CODE;
VAR FIRST, DRILL_OFF : BOOLEAN;
    K : INTEGER;

BEGIN
 FIRST := TRUE;
 DRILL_OFF := FALSE;
 I := I + 1;
 WRITELN(TEXTFILE,'(MSG,
******************************************************)');
 IF OPT_ARRAY^[I] = 'SIZE A'
   THEN WRITELN(TEXTFILE,'(MSG, *************** USE SIZE 40 DRILL
***************)')
  ELSE IF OPT_ARRAY^[I] = 'SIZE B'
   THEN WRITELN(TEXTFILE,'(MSG, *************** USE SIZE 30 DRILL
***************)')
  ELSE IF OPT_ARRAY^[I] = 'SIZE C'
   THEN WRITELN(TEXTFILE,'(MSG, *************** USE SIZE 20 DRILL
***************)')
  ELSE IF OPT_ARRAY^[I] = 'SIZE D'
   THEN WRITELN(TEXTFILE,'(MSG, *************** USE 7/16 DIA DRILL
***************)')
  ELSE IF OPT_ARRAY^[I] = 'SIZE E'
```

```
  THEN WRITELN(TEXTFILE,'(MSG, *************** USE 1/4 DIA DRILL
***************)')
 ELSE WRITELN(TEXTFILE,'(MSG, *************** USE SIZE F DRILL
*****************)');
 WRITELN(TEXTFILE,'(MSG,
*********************************************)');
 K := I + 1;
 I := I + 2;
 IF OPT_ARRAY^[K] = 'LEFT'
  THEN WRITELN(TEXTFILE,'M51')
 ELSE BEGIN
        WRITELN(TEXTFILE,'M53');
        WRITE(TEXTFILE,'G90G98XYZ0');
        WRITELN(TEXTFILE,RAPID_FEED);
        WRITELN(TEXTFILE,'M52');
      END;
 REPEAT
   IF (OPT_ARRAY^[I] <> 'DRILL OFF') AND (OPT_ARRAY^[I] <> 'Z IS UP') AND
(OPT_ARRAY^[I] <> 'Z IS DOWN')
    THEN BEGIN
          WRITE(TEXTFILE,OPT_ARRAY^[I]);
          WRITELN(TEXTFILE,RAPID_FEED);
          I := I + 1;
          IF FIRST = TRUE
            THEN BEGIN
                 WRITELN(TEXTFILE,'M19');
                 FIRST := FALSE;
                 END;
          IF OPT_ARRAY^[K] = 'LEFT'
            THEN BEGIN
                 WRITELN(TEXTFILE,'M21');
                 WRITELN(TEXTFILE,'M22');
                 WRITELN(TEXTFILE,'M23');
                 WRITELN(TEXTFILE,'M24');
                 WRITELN(TEXTFILE,'M25');
                 END
            ELSE BEGIN
                 WRITELN(TEXTFILE,'M31');
                 WRITELN(TEXTFILE,'M32');
                 WRITELN(TEXTFILE,'M33');
                 WRITELN(TEXTFILE,'M34');
                 WRITELN(TEXTFILE,'M35');
                 END;
         END
        ELSE IF OPT_ARRAY^[I] = 'DRILL OFF'
          THEN BEGIN
               WRITELN(TEXTFILE,'M20');
               WRITELN(TEXTFILE,'M50');
               WRITE(TEXTFILE,'XYZ0');
               WRITELN(TEXTFILE,RAPID_FEED);
               WRITELN(TEXTFILE,'G99');
               WRITELN(TEXTFILE,'M00');
               DRILL_OFF := TRUE;
               I := I + 1;
               END
          ELSE I := I + 1;
 UNTIL DRILL_OFF;
END;   {PROCEDURE DRILL_CODE}

(********************************************************************)
```

```
PROCEDURE ROUTE_CODE;
VAR ROUTE_OFF : BOOLEAN;

BEGIN
 ROUTE_OFF := FALSE;
 I := I + 1;
 WRITELN(TEXTFILE,'(MSG,
***************************************************)');
 WRITELN(TEXTFILE,'(MSG, *************** PROFILE PART OUTLINE
**************)');
 WRITELN(TEXTFILE,'(MSG, *********** USE .328 DIA. ROUTER TOOL
************)');
 WRITELN(TEXTFILE,'(MSG,
***************************************************)');
 WRITELN(TEXTFILE,'M54');
 WRITE(TEXTFILE,'G90G98XYZ0');
 WRITELN(TEXTFILE,RAPID_FEED);
 WRITELN(TEXTFILE,'M04G04F350');
 WRITELN(TEXTFILE,'M07');
 WRITELN(TEXTFILE,'M11');
 WRITELN(TEXTFILE,'G40');
 WRITE(TEXTFILE,'G01');
 REPEAT
  IF OPT_ARRAY^[I] = 'Z IS DOWN'
    THEN BEGIN
         WRITE(TEXTFILE,Z_DWN);
         WRITELN(TEXTFILE,ROUTE_FEED);
         IF (OPT_ARRAY^[I+1] <> 'Z IS UP') AND (OPT_ARRAY^[I+1] <> 'ROUTE
OFF')
            THEN BEGIN
                WRITE(TEXTFILE,OPT_ARRAY^[I+1]);
                WRITELN(TEXTFILE,ROUTE_FEED);
                I := I + 2;
                END
            ELSE I := I + 1;
         END
  ELSE IF OPT_ARRAY^[I] = 'Z IS UP'
    THEN BEGIN
         WRITE(TEXTFILE,Z_UP);
         WRITELN(TEXTFILE,ROUTE_FEED);
         IF (OPT_ARRAY^[I+1] <> 'Z IS DOWN') AND (OPT_ARRAY^[I+1] <> 'ROUTE
OFF')
            THEN BEGIN
                WRITE(TEXTFILE,OPT_ARRAY^[I+1]);
                WRITELN(TEXTFILE,RAPID_FEED);
                I := I + 2;
                END
            ELSE I := I + 1;
         END
  ELSE IF OPT_ARRAY^[I] = 'ROUTE OFF'
    THEN BEGIN
         WRITELN(TEXTFILE,'M15');
         WRITE(TEXTFILE,'XYZ0');
         WRITELN(TEXTFILE,RAPID_FEED);
         WRITELN(TEXTFILE,'G99');
         WRITELN(TEXTFILE,'M09');
         WRITELN(TEXTFILE,'M05G04F500');
         WRITELN(TEXTFILE,'M30');
         ROUTE_OFF := TRUE;
         I := I + 1;
         END
```

```
   ELSE BEGIN
        WRITELN(TEXTFILE,OPT_ARRAY^[I]);
        I := I + 1;
        END;
 UNTIL ROUTE_OFF;
END;   {PROCEDURE ROUTE_CODE}

(********************************************************************)

PROCEDURE CODE;

TYPE DISKIO = TEXT;

VAR I : INTEGER;
    MACHINE_CODE : LSTRING(70);
    TEXTFILE : DISKIO;

BEGIN
 I := 1;
 MACHINE_CODE := NULL;        {CLEAR STRING}
 ASSIGN(TEXTFILE,DISK_NAME);
 REWRITE(TEXTFILE);
 WRITELN(TEXTFILE,'%');
 CONCAT(MACHINE_CODE,'(TN,');
 CONCAT(MACHINE_CODE,PROG_NAME);
 CONCAT(MACHINE_CODE,')');
 WRITELN(TEXTFILE,MACHINE_CODE);
 MACHINE_CODE := NULL;        {CLEAR STRING}
 WRITELN(TEXTFILE,'(MSG, PRODUCTION TECHNOLOGY POST PROCESSOR VERSION 1.0)');

CONCAT(MACHINE_CODE,'(MSG,  ');
 CONCAT(MACHINE_CODE,OPER_NAME);
 CONCAT(MACHINE_CODE,' ');
 CONCAT(MACHINE_CODE,DATE);
 CONCAT(MACHINE_CODE,')');
 WRITELN(TEXTFILE,MACHINE_CODE);
 MACHINE_CODE := NULL;        {CLEAR STRING}
 CONCAT(MACHINE_CODE,'(MSG,  ');
 CONCAT(MACHINE_CODE,MSG);
 CONCAT(MACHINE_CODE,')');
 WRITELN(TEXTFILE,MACHINE_CODE);
 WRITELN(TEXTFILE,'G90G98XYZ0');
 WHILE I < AL - 1 DO
   BEGIN
     IF OPT_ARRAY^[I] = 'DRILL ON'
      THEN DRILL_CODE(OPT_ARRAY,RAPID_FEED,TEXTFILE,I)
      ELSE IF OPT_ARRAY^[I] = 'ROUTE ON'
       THEN ROUTE_CODE(OPT_ARRAY,RAPID_FEED,ROUTE_FEED,Z_UP,Z_DWN,TEXTFILE,I)
      ELSE I := I + 1;
    END;   {WHILE LOOP}
  CLOSE(TEXTFILE);
END;   {PROCEDURE CODE}

(********************************************************************)

PROCEDURE MEMORY_MANAGEMENT;
VAR PREG, BLKSEG, BLKSIZE, ERCODE1, ERCODE2 : WORD;
    I : INTEGER;

BEGIN
 PREG := 4096;     {ALLOCATE PARAGRAPHS OF MEMORY 4096P = 64K}
```

```
SHRINKMM(ERCODE1);{RELEASE MEMORY TO FREE MEMORY POOL}
IF ERCODE1 = 0
 THEN BEGIN
       FOR I := 1 TO 3 DO
         BEGIN
          ALLOCMM(PREG,BLKSEG,BLKSIZE,ERCODE2);
          IF ERCODE2 = 0
            THEN BEGIN
                IF I = 1
                  THEN BEGIN
                       XY_ARRAY.S := BLKSEG;
                       XY_ARRAY.R := 0;
                       END
                 ELSE IF I = 2
                   THEN BEGIN
                        OPT_ARRAY.S := BLKSEG;
                        OPT_ARRAY.R := 0;
                        END
                 ELSE BEGIN
                        INT_ARRAY.S := BLKSEG;
                        INT_ARRAY.R := 0;
                        END;
                END
          ELSE IF ERCODE2 = 1
            THEN WRITELN('DOS MEMORY CONTROL BLOCKS DESTROYED.')
          ELSE IF ERCODE2 = 2
            THEN WRITELN('NOT ENOUGH MEMORY AVALIABLE, BLOCK SIZE = ',BLKSIZE)

ELSE WRITELN('ERCODE2 = ',ERCODE2,' CHECK MANUAL.');
         END; {I FOR LOOP}
      END
 ELSE IF ERCODE1 = 1
   THEN WRITELN('DOS MEMORY CONTROL BLOCKS DESTROYED.')
 ELSE IF ERCODE1 = 2
   THEN WRITELN('NOT ENOUGH MEMORY AVALIABLE TO FREE.')
 ELSE IF ERCODE1 = 3
   THEN WRITELN('ILLEGAL SEGMENT ADDRESS.')
 ELSE WRITELN('ERCODE1 = ',ERCODE1,' CHECK MANUAL.');
 IF (ERCODE1 <> 0) OR (ERCODE2 <> 0)
   THEN ABORTUU('CONTACT PRODUCTION TECHNOLOGY.');
END; {PROCEDURE ALLOCATE_MEMORY}

BEGIN
END. {IMPLEMENTATION OF ABCODE}
```

APPENDIX 4

ABCODE.INT

Copyright © 1989, LTV Aerospace and Defense Co.

```
{INTERFACE FOR ABCODE, M AND G CODE POSTPROCESSOR FOR SMDGT.  SHEET METAL
DIGITIZER}
{FOR ALLEN-BRADLEY 7320.  MEMORY MANAGEMENT. VERSION 1.0 (C) 1986, PRODUCTION
TECHNOLOGY}

{$MESSAGE:'Including Interface for ABCODE, Version 1.0'}

INTERFACE;
```

```
UNIT ABCODE(INDATA, XYDATA, PARM, XY_ARRAY, OPT_ARRAY, INT_ARRAY, DRILL_CODE,
     ROUTE_CODE, CODE, MEMORY_MANAGEMENT);

TYPE INDATA = ADS OF PACKED ARRAY[1..3000,1..2] OF INTEGER4;
     XYDATA = ADS OF PACKED ARRAY[1..3000] OF LSTRING(18);
       PARM = LSTRING(40);

VAR XY_ARRAY, OPT_ARRAY : XYDATA;
    INT_ARRAY : INDATA;

PROCEDURE DRILL_CODE(VAR OPT_ARRAY : XYDATA; RAPID_FEED : PARM;VAR TEXTFILE :
TEXT; VAR I : INTEGER);

PROCEDURE ROUTE_CODE(VAR OPT_ARRAY : XYDATA; RAPID_FEED, ROUTE_FEED, Z_UP,
            Z_DWN : PARM; VAR TEXTFILE : TEXT; VAR I : INTEGER);

PROCEDURE CODE(VAR OPT_ARRAY:XYDATA; RAPID_FEED, ROUTE_FEED, Z_UP, Z_DWN,
PROG_NAME, OPER_NAME, DATE, MSG, DISK_NAME :PARM;AL:INTEGER);

PROCEDURE MEMORY_MANAGEMENT(VAR XY_ARRAY, OPT_ARRAY : XYDATA; VAR INT_ARRAY :
                     INDATA);

BEGIN
END;  {INTERFACE OF ABCODE}
```

APPENDIX 5

OUTPORT.ASM

Copyright © 1989, LTV Aerospace and Defense Co.

```
TITLE    OUTPORT

PUBLIC   OUTPORT

CSEG     SEGMENT
ASSUME   CS:CSEG
OUTPORT  PROC    FAR
         PUSH    BP
         MOV     BP,SP
         MOV     AL,[BP]+6       ;VALUE
         MOV     DX,[BP]+8       ;PORT NUMBER
         OUT     DX,AL           ;SEND VALUE TO PORT
         POP     BP
         RET     4
OUTPORT  ENDP
CSEG     ENDS
         END
```

APPENDIX 6

GTDATA.ASM

Copyright © 1989, LTV Aerospace and Defense Co.

```
TITLE    GTDATA

PUBLIC   GTDATA

CSEG     SEGMENT
ASSUME   CS:CSEG
```

```
GTDATA   PROC    FAR
         PUSH    BP
         MOV     BP,SP
         MOV     DX,768          ;IO PORT
         MOV     AL,2
         OUT     DX,AL           ;SET LOAD REGISTERS
         MOV     DX,770          ;IO PORT
         MOV     SI,[BP]+6       ;ADDRESS OF STRING, LENGTH OF STRING
         MOV     CX,16           ;SET COUNTER
NEXT:    INC     SI              ;MOVE POINTER TO NEXT CHARACTER IN STRING
         IN      AL,DX           ;GET CHARACTER
         MOV     [SI],AL         ;STORE CHARACTER TO STRING VARIABLE
         LOOP    NEXT            ;GET 16 CHARACTERS
         POP     BP
         RET     4
GTDATA   ENDP
CSEG     ENDS
         END
```

APPENDIX 7

LOCATE.ASM

Copyright © 1989, LTV Aerospace and Defense Co.

```
TITLE    LOCATE

PUBLIC   LOCATE

CSEG     SEGMENT
         ASSUME  CS:CSEG
LOCATE   PROC    FAR
         PUSH    BP
         MOV     BP,SP
         MOV     AH,0            ;SET VIDEO MODE INTERUPT
         MOV     AL,3            ;SET 80X25 COLOR TEXT MODE
         INT     10H             ;VIDEO I/O INTERUPT
         MOV     AH,5            ;SET ACTIVE DISPLAY PAGE INTERUPT
         MOV     AL,0            ;SET PAGE NUMBER
         INT     10H             ;VIDEO I/O INTERUPT
         MOV     BH,0            ;SELECT ACTIVE PAGE NUMBER
         MOV     AH,2            ;SET CURSOR POSITION INTERUPT
         MOV     DH,[BP]+8       ;ROW NUMBER OF CURSOR
         MOV     DL,[BP]+6       ;COLUMN NUMBER OF CURSOR
         INT     10H             ;VIDEO I/O INTERUPT
         POP     BP
         RET     4
LOCATE   ENDP
CSEG     ENDS
         END
```

APPENDIX 8

INSTAT.ASM

Copyright © 1989, LTV Aerospace and Defense Co.

```
TITLE    INSTAT

PUBLIC   INSTAT
```

```
        CSEG    SEGMENT
                ASSUME  CS:CSEG
        INSTAT  PROC    FAR
                PUSH    BP
                MOV     BP,SP
                MOV     DX,[BP]+6
        NEXT:   IN      AL,DX
                CMP     AL,0            ;TEST IF A BUTTON HAS BEEN PRESSED
                JZ      NEXT            ;IF NOT, READ DATA FLAGS AGAIN
                MOV     BL,AL
                MOV     AL,8
                MOV     DX,768          ;IO PORT
                OUT     DX,AL           ;RESET DATA FLAGS
                MOV     AL,BL
                MOV     AH,00
                POP     BP
                RET     2
        INSTAT  ENDP
        CSEG    ENDS
                END
```

APPENDIX 9

DISTANCE.PAS

Copyright © 1989, LTV Aerospace and Defense Co.

```
PROGRAM DISTANCE (INPUT, OUTPUT);

TYPE POINTS = ARRAY[1..3,1..3] OF REAL8;

VAR GEOMETRY : POINTS;

FUNCTION SRDRQQ(CONSTS A : REAL8) : REAL8; EXTERN;

(*******************************************************************)

PROCEDURE GETPOINTS(VAR GEOMETRY : POINTS);
VAR I : INTEGER;

BEGIN
  WRITELN('This program will test the equations for determining the distance');
  WRITELN('between a point and a line in Euclidean three space.');
  WRITELN;
    FOR I := 1 TO 3 DO
      BEGIN
        WRITE('Enter X value of point.   ');
        READLN(GEOMETRY[I,1]);
        WRITE('Enter Y value of point.   ');
        READLN(GEOMETRY[I,2]);
        WRITE('Enter Z value of point.   ');
        READLN(GEOMETRY[I,3]);
      END; {FOR LOOP}
END; {PROCEDURE GETPOINTS}

(*******************************************************************)

PROCEDURE GETDIST(GEOMETRY : POINTS);
VAR COSX, COSY, COSZ, LENGTH, SEGX, SEGY, SEGZ : REAL8;
    DIST, DISTX, DISTY, DISTZ : REAL8;
```

```
BEGIN

{DETERMINE LINE SEGMENT DISTANCE IN X, Y AND Z}

SEGX := GEOMETRY[2,1] - GEOMETRY[1,1];
SEGY := GEOMETRY[2,2] - GEOMETRY[1,2];
SEGZ := GEOMETRY[2,3] - GEOMETRY[1,3];

{DETERMINE DISTANCE FROM POINT ON LINE SEGMENT TO POINT IN SPACE IN X, Y AND
  Z}
DISTX := GEOMETRY[3,1] - GEOMETRY[1,1];
DISTY := GEOMETRY[3,2] - GEOMETRY[1,2];
DISTZ := GEOMETRY[3,3] - GEOMETRY[1,3];

{DETERMINE LENGTH OF LINE SEGMENT}

LENGTH := SRDRQQ(SQR(SEGX) + SQR(SEGY) + SQR(SEGZ));

{DETERMINE DIRECTION COSINES OF LINE SEGMENT}

COSX := SEGX/LENGTH;
COSY := SEGY/LENGTH;
COSZ := SEGZ/LENGTH;

{DETERMINE DISTANCE FROM POINT IN SPACE TO LINE SEGMENT}

DIST := SRDRQQ (ABS (SQR (DISTX) + SQR (DISTY) + SQR (DISTZ)-SQR
    (DISTX*COSX+DISTY*COSY+DISTZ*COSZ)));

WRITELN('The distance between the point and the line segment is ',DIST);
END; {PROCEDURE GETDIST}

(*******-MAIN PROGRAM-****************************************************)

BEGIN
 GETPOINTS(GEOMETRY);
 GETDIST(GEOMETRY);
END. {MAIN PROGRAM}
```

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A digitizing system for generating, recording, and optimizing coordinate data representative of a traced path comprising:
   a) a digitizer support structure;
   b) a stylus assembly functionally supported by said support structure and displaceable in a first dimension and in a second dimension;
   c) a scaling network functionally interconnected with said stylus assembly and responsive to stylus movement for generating stylus displacement signals indicating stylus movement in said first and second dimensions;
   d) a first circuit responsive to said stylus displacement signals for generating count signals representing the displacement of said stylus relative to a predetermined starting point;
   e) initiating means responsive to said count signals for generating an initiating signal whenever said stylus travels a predetermined distance;
   f) a second circuit responsive to said initiating signal and to said count signals for generating coordinate data representative of said count signals; and
   g) a data processor for receiving and processing said coordinate data, said data processor including:
      i) memory means for storing said coordinate data thereby resulting in an ordered set of data points $P_a, P_b, \ldots, (P_i), \ldots, P_n$, where $P_n$ is the last data point in the set; and
      ii) optimizing means for optimizing the stored coordinate data;

wherein said optimizing means comprises:

a) means for establishing a direction vector through points $P_a$ and $P_b$, where $P_a$ is the base point for said direction vector;

b) means for establishing a tolerance band of predetermined width on either side of and parallel to said direction vector;

c) means for identifying a point $P_i$, if any, following the base point that falls outside said tolerance band;

d) data discarding means responsive to the existence or nonexistence of $P_i$ for discarding substantially all points between the base point and a point $P_h$, which is a point within said tolerance band preceding the point $P_i$ in said ordered set of data points, only if $P_i$ exists, otherwise, if $P_i$ does not exist, said means functioning to discard substantially all data points between the base point and the last data point, $P_n$, in which case said set of data points has been completely optimized;

e) means continually operable until said set of data points has been completely optimized for determining whether said set of data points has been completely optimized and if said set has not been completely optimized said means further functioning to:

(i) establish a new direction vector through the point $P_h$ and point $P_i$, where $P_h$ is the base point for said new direction vector, (ii) establish a new tolerance band of predetermined width on either side of and parallel to said new direction vector, (iii) identify a new point Phd i, if any, following the base point that falls outside said new tolerance band, and then (iv) employ said data discarding means.

2. The system of claim 1 wherein said second circuit further functions to generate coordinate data without interrupting the function of said first circuit.

3. The system of claim 2 further comprising means for associating the correct sign, either positive or negative, with said coordinate data.

4. The system of claim 1 wherein said stylus assembly is also displaceable in a third dimension and wherein said scaling network further functions to generate stylus displacement signals indicating stylus movement in said third dimension.

5. The system of claim 4 wherein said second circuit further functions to generate coordinate data without interrupting the function of said first circuit.

6. The system of claim 5 further comprising means for associating the correct sign, either positive or negative, with said coordinate data.

7. A digitizing system for generating, recording, and optimizing coordinate data representative of a traced path comprising:

a) a digitizer support structure;

b) an arm assembly slidably connected to said support structure and displaceable in a first dimension only;

c) a stylus assembly slidably connected to said arm assembly and displaceable in said first dimension and in a second dimension;

d) scaling network means functionally interconnected with said arm assembly and said stylus assembly and responsive to stylus movement for generating stylus displacement signals indicating stylus movement in said first and second dimensions;

e) means for converting said stylus displacement signals into direction count pulses;

f) counting means responsive to said direction count pulses for generating count signals representing the displacement of said stylus relative to a predetermined starting point;

g) initiating means responsive to said count signals for generating an initiating signal whenever said stylus travels a predetermined distance;

h) data coordinate generating means responsive to said initiating signal and to said count signals for generating coordinate data representative of said count signals; and i) data processing means for receiving and processing said coordinate data, said data processing means including:

(i) a memory;

(ii) means for successively storing said coordinate data in said memory thereby resulting in an ordered set of data points $P_a, P_b, \ldots, (P_i), \ldots, P_n$, where $P_n$ is the last data point in the set; and (iii) optimizing means for optimizing the stored coordinate data;

wherein said optimizing means comprises:

a) means for establishing a direction vector through points $P_a$ and $P_b$, where $P_a$ is the base point for said direction vector;

b) means for establishing a tolerance band of predetermined width on either side of and parallel to said direction vector;

c) means for identifying a point $P_i$, if any, following the base point that falls outside said tolerance band;

d) data discarding means responsive to the existence or nonexistence of $P_i$ for discarding substantially all points between the base point and a point $P_h$, which is a point within said tolerance band preceding the point $P_i$ in said ordered set of data points, only if $P_i$ exists, otherwise, if $P_i$ does not exist, said means functioning to discard substantially all data points between the base point and the last data point, $P_n$, in which case said set of data points has been completely optimized;

e) means continually operable until said set of data points has been completely optimized for determining whether said set of data points has been completely optimized and if said set has not been completely optimized said means further functioning to:

(i) establish a new direction vector through the point $P_h$ and point $P_i$, where $P_h$ is the base point for said new direction vector, (ii) establish a new tolerance band of predetermined width on either side of and parallel to said new direction vector, (iii) identify a new point $P_i$, if any, following the base point that falls outside said new tolerance band, and then (iv) employ said data discarding means.

8. The system of claim 7 wherein said data coordinate generating means further function to generate coordinate data without interrupting the function of said counting means.

9. The system of claim 8 wherein said data coordinate generating means function to generate said coordinate data in the form of ASCII text characters.

10. The system of claim 9 wherein said data processing means includes an "IBM" compatible personal computer.

11. The system of claim 7 wherein said stylus assembly is also displaceable in a third dimension.

12. The system of claim 11 wherein said scaling network means further function to generate stylus displacement signals indicating stylus movement in said third dimension.

13. The system of claim 12 wherein said data coordinate generating means further function to generate coordinate data without interrupting the function of said counting means.

14. The system of claim 13 wherein said data coordinate generating means function to generate said coordinate data in the form of ASCII text characters.

15. The system of claim 14 wherein said data processing means includes an "IBM" compatible personal computer.

16. A digitizing system for generating, recording, and optimizing coordinate data representative of a traced path comprising:
  a) a digitizer table;
  b) an arm assembly slidably connected to said table and displaceable in a first dimension;
  c) a stylus assembly slidably connected to said arm assembly and displaceable in said first dimension and in a second dimension;
  d) scaling network means functionally interconnected with said arm assembly and said stylus assembly and responsive to stylus movement for generating stylus displacement signals indicating stylus movement in said first and second dimensions;
  e) manual entry means for generating function request signals;
  f) a digital computer including a memory means;
  g) a digitizer card functionally connected to said digital computer, to said scaling network means, and to said manual entry means, said digitizer card comprising:
    (i) means for receiving said stylus displacement signals and for converting said signals into direction count pulses;
    (ii) counting means responsive to said direction count pulses for generating count signals representing the displacement of said stylus relative to a predetermined starting point;
    (iii) initiating means responsive to said count signals for generating an initiating signal whenever said stylus travels a predetermined distance in either said first or second dimensions;
    (iv) data coordinate generating means responsive to said initiating signal and to said count signals for generating coordinate data, said coordinate data being in the form of ASCII text characters and representative of said count signals;
    (v) means for associating the correct sign, either positive or negative, with said coordinate data; and
    (vi) buffer means for temporarily storing said coordinate data until read by the digital computer, for receiving and temporarily storing said function request signals until read by the digital computer, and for receiving command signals from said digital computer;
  h) means for successively storing said coordinate data in said memory thereby resulting in an ordered set of stored data points $P_1, P_2, \ldots, (P_i), \ldots, P_n$ is the last data point in the set; and
  i) optimizing means for optimizing said stored set of data points wherein said optimizing means includes:
    (i) means for establishing a direction vector through the first two points $P_1$ and $P_2$, where $P_1$ is the base point for said direction vector;
    (ii) means for establishing a tolerance band of predetermined width on either side of and parallel to said direction vector;
    (iii) means for identifying the first point $P_i$, if any, following the base point that falls outside said tolerance band;
    (iv) data discarding means responsive to the existence or nonexistence of $P_i$ for discarding all points between the base point and a point $P_{i-1}$, which is the point immediately preceding the point $P_i$, if $P_i$ exists, otherwise, if $P_i$ does not exist, said means functioning to discard all data points between the base point and the last data point, $P_n$, in which case said set of data points has been completely optimized; and
    (v) means continually operable until said set of data points has been completely optimized for determining whether said set of data points has been completely optimized and if said set has not been completely optimized said means further functioning to:
      (1) establish a new direction vector through point $P_{i-1}$ and point $P_i$, where $P_{i-1}$ is the base point for said new direction vector,
      (2) establish a new tolerance band of predetermined width on either side of and parallel to said new direction vector,
      (3) identify a new point $P_i$, if any, following the base point that is the first point to fall outside said new tolerance band, and then
      (4) employ said data discarding means.

17. The system of claim 16 wherein said stylus assembly is also displaceable in a third dimension.

18. The system of claim 17 wherein said scaling network means further function to generate stylus displacement signals indicating stylus movement in said third dimension.

19. The system of claim 18 wherein said initiating means further functions to generate an initiating signal whenever said stylus travels a predetermined distance in said third dimension.

20. The system of claim 16 wherein said digital computer is an "IBM" compatible personal computer.

21. The system of claim 19 wherein said digital computer is an "IBM" compatible personal computer.

22. A method of generating, recording, and optimizing coordinate data representative of a path traced by a digitizing system wherein said digitizing system includes a digitizer support structure, a stylus assembly functionally supported by said support structure and displaceable in two or three dimensions, and a scaling network functionally associated with said stylus assembly and responsive to stylus movement for generating stylus displacement signals; comprising the steps of:
  a) generating stylus displacement signals by tracing a path with said stylus assembly;
  b) converting said stylus displacement signals into direction counts;
  c) counting said direction counts relative to a predetermined starting point;
  d) generating coordinate data indicative of the displacement of said stylus relative to said starting point whenever said stylus travels a predetermined distance;

e) successively storing said coordinate data in a memory so that an ordered set of data points $P_1, P_2, \ldots, (P_i), \ldots, P_n$ representative of said traced path is created where $P_n$ is the last data point in the set; and f) reducing the total number of points in said ordered set without substantially altering the representation of said traced path thereby to optimize said set of data points by;

1) establishing a direction vector through the first two points $P_1$ and $P_2$, where $P_1$ is the base point for said direction vector;

2) establishing a tolerance band of predetermined width on either side of and parallel to said direction vector;

3) identifying the first point $P_i$, if any, following the base point that falls outside said tolerance band;

4) if $P_i$ exists, discarding all points between the base point and a point $P_{i-1}$ which is the point immediately preceding the point $P_i$, otherwise, if no point $P_i$ exists which falls outside said tolerance band, then discarding all points between the base point and the last data point, $P_n$, thereby defining completion of said optimization step;

5) if the optimization procedure is not complete, then
  (i) establishing a new direction vector through point $P_{i-1}$ and point $P_i$, where $P_{i-1}$ is the base point for said new direction vector;
  (ii) establishing a new tolerance band of predetermined width on either side of and parallel to said new direction vector;
  (iii) identifying a new point $P_i$, if any, following the base point that is the first point to fall outside said new tolerance band;
  (iv) repeating steps (4) through (5)(iii) until optimization is complete.

23. The procedure of claim 22 wherein said step of determining the first point $P_i$, if any, following the base point that falls outside said tolerance band further includes successively determining the perpendicular distance from each point following the base point in said ordered set of data points to said direction vector and then comparing each said perpendicular distance with the predetermined width of said tolerance band.

* * * * *

UNITED STATES PATENT AND TRADEMARK OFFICE
CERTIFICATE OF CORRECTION

PATENT NO. : 5,126,948
DATED : June 30, 1992
INVENTOR(S) : Lee D. Mitchell and Mark Rice It is certified that error appears in the above-identified patent and that said Letters Patent hereby corrected as shown below:

Column 63, line 32, "Phd i," should read --$P_i$,--.

Column 65, line 64, after "$P_n$" insert --, where $P_n$ --.

Signed and Sealed this

Nineteenth Day of October, 1993

Attest:

BRUCE LEHMAN

*Attesting Officer*    *Commissioner of Patents and Trademarks*